(12) United States Patent
Wei et al.

(10) Patent No.: US 12,556,602 B2
(45) Date of Patent: Feb. 17, 2026

(54) METHOD FOR DETERMINING APPLICATION SERVER FOR A TERMINAL

(71) Applicant: HUAWEI TECHNOLOGIES CO., LTD., Guangdong (CN)

(72) Inventors: Xinpeng Wei, Beijing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/621,225

(22) Filed: Mar. 29, 2024

(65) Prior Publication Data

US 2024/0244107 A1    Jul. 18, 2024

Related U.S. Application Data

(63) Continuation of application No. PCT/CN2022/120579, filed on Sep. 22, 2022.

(30) Foreign Application Priority Data

Sep. 30, 2021   (CN) .......................... 202111156973.0

(51) Int. Cl.
*H04L 67/1014*   (2022.01)
*H04L 67/1021*   (2022.01)
(Continued)

(52) U.S. Cl.
CPC ...... *H04L 67/1014* (2013.01); *H04L 67/1021* (2013.01); *H04L 67/141* (2013.01); *H04W 8/22* (2013.01)

(58) Field of Classification Search
CPC ............. H04L 67/1014; H04L 67/1021; H04L 67/141; H04W 8/22
See application file for complete search history.

(56) References Cited

U.S. PATENT DOCUMENTS

| 12,256,280 B2 * | 3/2025 | Mihály ................. H04W 76/22 |
| 2018/0192390 A1 * | 7/2018 | Li .......................... H04W 72/53 |

(Continued)

FOREIGN PATENT DOCUMENTS

WO       2021017621 A1    2/2021

OTHER PUBLICATIONS

Nokia et al:"KI 1: (new) Solution #22': LDNSR as a (pseudo) DNS Resolver to support low latency applications." SA WG2 Meeting #141e S2-2006935 Oct. 12-23, 2020; Elbonia, total 10 pages.

(Continued)

*Primary Examiner* — Nicholas R Taylor

(57) ABSTRACT

This application provides a method and an apparatus for determining an application server. The method is performed by a first network element and includes: receiving first request information, where the first request information includes first service description information, the first service description information identifies a service accessed by a terminal device, and the first request information is for requesting to determine first information for the terminal device; and in a case that the terminal device belongs to a first terminal group, determining the first information, where the first information is for determining a first application server for a terminal device in the first terminal group. Based on the foregoing technical solution, a same edge application server can be determined for terminal devices that access a same (specific) service and that are located in a specific area location.

17 Claims, 11 Drawing Sheets

(51) Int. Cl.
*H04L 67/141* (2022.01)
*H04W 8/22* (2009.01)

(56) References Cited

U.S. PATENT DOCUMENTS

2018/0192471 A1* 7/2018 Li .................... H04W 72/53
2022/0086218 A1* 3/2022 Sabella ............. H04M 15/66

OTHER PUBLICATIONS

PCT International Search Report for Application No. PCT/CN2022/120579 dated Sep. 22, 2022, 10 pages.
Extended European Search Report for Application No. 22874767.1 dated Aug. 30, 2024, 11 pages.

\* cited by examiner

METHOD FOR DETERMINING APPLICATION SERVER FOR A TERMINAL

CROSS-REFERENCE TO RELATED APPLICATIONS

This application is a continuation of International Application No. PCT/CN2022/120579, filed on Sep. 22, 2022, which claims priority to Chinese Patent Application No. 202111156973.0, filed on Sep. 30, 2021. The disclosures of the aforementioned applications are hereby incorporated by reference in their entireties.

TECHNICAL FIELD

Embodiments of this application relate to the communication field, and more specifically, to a method and an apparatus for determining an application server.

BACKGROUND

Edge computing is a new network architecture. In the edge computing architecture, computing resources are deployed at a network edge close to users, to optimize a resource access process for users, for example, shorten a network transmission delay between users and computing resources. In a $5^{th}$ generation (5G) network, before using an edge service, user equipment (UE) needs to obtain an internet protocol (IP) address of an edge application server (EAS) by using a domain name system (DNS)-based service discovery mechanism.

Currently, in edge computing services, some new application scenarios emerge. These scenarios require that UEs in a geographic area can access a same edge application server (EAS) when accessing a same service. For example, in an augmented reality (AR) scenario in which a plurality of users play an AR interactive game together, when the users are in a same location area, all the users are connected to a same EAS server. In a vehicle-to-everything (V2X) scenario, vehicles in a same road section exchange road condition information, to ensure that all the vehicles are connected to a same edge application server. These new edge computing service application scenarios also bring new technical problems.

In view of this, how to determine a same edge application server (EAS) for terminal devices located in a specific area location range that access a same (specific) service becomes an urgent problem to be resolved.

SUMMARY

Embodiments of this application provide a method and apparatus for determining an application server, to determine a same edge application server (EAS) for terminal devices located in a specific area location range that access a same (specific) service.

It should be noted that the edge application server EAS may also be referred to as an application server, an application instance, an edge application instance, a multi-access edge computing (MEC) application (server), an EAS function, or the like. For ease of description, in embodiments of this application, the edge application server is uniformly described as an application server (EAS).

According to a first aspect, a method for determining an application server is provided. The method is performed by a first network element and includes: receiving first request information, where the first request information includes first service description information, the first service description information identifies a service accessed by a terminal device, and the first request information is for requesting to determine first information for the terminal device; and in a case that the terminal device belongs to a first terminal group, determining the first information, where the first information is for determining a first application server for a terminal device in the first terminal group.

Based on the foregoing technical solution, the first network element receives the first request information sent by the terminal device, where the first request information request is for determining the first information for the terminal device. The first request information includes the first service description information of the terminal device, and the first service description information identifies the service accessed by the terminal device. When determining that the terminal device belongs to the first terminal group, the first network element determines the first information, where the first information is for determining a same application server (the first application server) for the terminal device in the first terminal group. Therefore, a same edge application server (EAS) can be determined for terminal devices located in a specific area location range that access a same (specific) service.

With reference to the first aspect, in some implementations of the first aspect, the method further includes: receiving second information and second service description information, where the second information indicates to determine the first application server for the first terminal group, and the second service description information identifies a service accessed by the first terminal group. The case that the terminal device belongs to the first terminal group includes: the service accessed by the terminal device is the same as the service accessed by the first terminal group. Based on the foregoing technical solution, a same edge application server (EAS) can be determined for terminal devices located in a specific area location range that access a same (specific) service.

With reference to the first aspect, in some implementations of the first aspect, the first service description information or the second service description information includes at least one of the following: a fully qualified domain name (FQDN) and application identifier information.

With reference to the first aspect, in some implementations of the first aspect, the method further includes: receiving first area location information, where the first terminal group is located in a first area location indicated by the first area location information. The case that the terminal device belongs to the first terminal group further includes: the terminal device is located in the first area location indicated by the first area location information. Based on the foregoing technical solution, a same edge application server (EAS) can be determined for terminal devices located in a specific area location range that access a same (specific) service.

With reference to the first aspect, in some implementations of the second aspect, the method further includes: sending the second service description information to a second network element; and the determining first information includes: receiving the first information from the second network element.

With reference to the first aspect, in some implementations of the first aspect, the method further includes: sending the second service description information to a second network element; and receiving third information from the second network element, where the third information is for determining a second application server for the first terminal group.

With reference to the first aspect, in some implementations of the first aspect, the method further includes: sending the first information to the second network element.

With reference to the first aspect, in some implementations of the first aspect, the first information includes at least one of the following: a first client subnet option (ECS option), a first data network access identifier (DNAI), and a first application server address (EAS IP).

With reference to the first aspect, in some implementations of the first aspect, the third information includes at least one of the following: a second client subnet option (ECS option), a second data network access identifier (DNAI), and a second application server address (EAS IP).

With reference to the first aspect, in some implementations of the first aspect, the first area location information is sent to the second network element, where the first terminal group is located in the first area location indicated by the first area location information.

With reference to the first aspect, in some implementations of the first aspect, identification information is sent to the second network element, where the identification information identifies the first terminal group.

With reference to the first aspect, in some implementations of the first aspect, the method further includes: receiving fourth information, where the fourth information includes at least one of the following: the first client subnet option (ECS option), the first data network access identifier DNAI, and the first application server address (EAS IP); and sending the fourth information to a fifth network element.

According to a second aspect, a method for determining an application server is provided. The method is performed by a first network element, and includes: receiving protocol data unit (PDU) session request information, where the PDU session request information includes first service description information, the PDU session request information is for requesting to establish a PDU session, and the first service description information identifies a service accessed by a terminal device; and in a case that the terminal device belongs to a first terminal group, determining first information, where the first information is for determining a first application server for a terminal device in the first terminal group.

Based on the foregoing technical solution, the first network element receives the PDU session request information sent by the terminal device, where the PDU session request information includes the first service description information of the terminal device, and the first service description information identifies the service accessed by the terminal device. When determining that the terminal device belongs to the first terminal group, the first network element determines the first information, where the first information is for determining a same application server (the first application server) for the terminal device in the first terminal group. Therefore, a same edge application server (EAS) can be determined for terminal devices located in a specific area location range that access a same (specific) service.

With reference to the second aspect, in some implementations of the second aspect, the method further includes: receiving second information and second service description information, where the second information indicates to determine the first application server for the first terminal group, and the second service description information identifies a service accessed by the first terminal group. The case that the terminal device belongs to a first terminal group includes: the service accessed by the terminal device is the same as the service accessed by the first terminal group. Based on the foregoing technical solution, a same edge application server (EAS) can be determined for terminal devices located in a specific area location range that access a same (specific) service.

With reference to the second aspect, in some implementations of the second aspect, the first service description information or the second service description information includes at least one of the following: a data network name (DNN) and single network slice selection assistance information (S-NSSAI).

With reference to the second aspect, in some implementations of the second aspect, the method further includes: receiving first area location information, where the first terminal group is located in a first area location indicated by the first area location information. The case that the terminal device belongs to the first terminal group further includes: the terminal device is located in the first area location indicated by the first area location information. Based on the foregoing technical solution, a same edge application server (EAS) can be determined for terminal devices located in a specific area location range that access a same (specific) service.

With reference to the second aspect, in some implementations of the second aspect, the method further includes: sending the second service description information to a second network element; and the determining first information includes: receiving the first information from the second network element.

With reference to the second aspect, in some implementations of the second aspect, the method further includes: sending the second service description information to a second network element; and receiving third information from the second network element, where the third information is for determining a second application server for the first terminal group.

With reference to the second aspect, in some implementations of the second aspect, the method further includes: sending the first information to the second network element.

With reference to the second aspect, in some implementations of the second aspect, the first information includes at least one of the following:
    a first client subnet option (ECS option), a first data network access identifier (DNAI), and a first application server address (EAS IP).

With reference to the second aspect, in some implementations of the second aspect, the third information includes at least one of the following: a second client subnet option (ECS option), a second data network access identifier (DNAI), and a second application server address (EAS IP).

With reference to the second aspect, in some implementations of the second aspect, the first area location information is sent to the second network element, where the first terminal group is located in the first area location indicated by the first area location information.

With reference to the second aspect, in some implementations of the second aspect, identification information is sent to the second network element, where the identification information identifies the first terminal group.

With reference to the second aspect, in some implementations of the second aspect, the method further includes: receiving fourth information, where the fourth information includes at least one of the following: the first client subnet option (ECS option), the first data network access identifier (DNAI), and the first application server address (EAS IP); and sending the fourth information to a fifth network element.

According to a third aspect, a method for determining an application server is provided. The method is performed by a second network element, and includes: receiving second service description information sent by a first network element, where the second service description information identifies a service accessed by a first terminal group; determining first information based on a correspondence between the second service description information and the first information; and sending the first information to the first network element, where the first information is for determining a first application server for a terminal device in the first terminal group.

Based on the foregoing technical solution, the second network element determines the first information based on the correspondence between the second service description information and the first information that is sent by the first network element, where the first information is for determining the first application server for the first terminal group. Therefore, a same edge application server (EAS) can be determined for terminal devices located in a specific area location range that access a same (specific) service.

With reference to the third aspect, in some implementations of the third aspect, the method further includes: receiving the first information sent by the first network element.

With reference to the third aspect, in some implementations of the third aspect, the method further includes: obtaining the correspondence between the second service description information and the first information from a fourth network element.

With reference to the third aspect, in some implementations of the third aspect, the first information includes at least one of the following: a first client subnet option (ECS option), a first data network access identifier (DNAI), and a first application server address (EAS IP).

With reference to the third aspect, in some implementations of the third aspect, first area location information sent by the first network element is received, where the first terminal group is located in a first area location indicated by the first area location information.

With reference to the third aspect, in some implementations of the third aspect, identification information sent by the first network element is received, where the identification information identifies the first terminal group.

With reference to the third aspect, the second service description information includes at least one of the following: a fully qualified domain name (FQDN), a data network name (DNN), application identifier information, and single network slice selection assistance information S-NSSAI.

According to a fourth aspect, a method for determining an application server is provided. The method is performed by a third network element, and includes: sending second information and second service description information, where the second service description information identifies a service accessed by a first terminal group, and the second information indicates to determine a first application server for the first terminal group.

With reference to the fourth aspect, in some implementations of the fourth aspect, the second service description information includes at least one of the following: a fully qualified domain name (FQDN), a data network name (DNN), application identifier information, and single network slice selection assistance information (S-NSSAI).

With reference to the fourth aspect, in some implementations of the fourth aspect, the method further includes: sending fourth information, where the fourth information includes at least one of the following: a first client subnet option (ECS option), a first data network access identifier (DNAI), and a first application server address (EAS IP).

According to a fifth aspect, a first network element is provided, including: a receiving unit, configured to receive first request information, where the first request information includes first service description information, the first service description information identifies a service accessed by a terminal device, and the first request information is for requesting to determine first information for the terminal device; and a processing unit, configured to determine the first information in a case that the terminal device belongs to a first terminal group, where the first information is for determining a first application server for a terminal device in the first terminal group.

With reference to the fifth aspect, in some implementations of the fifth aspect, the receiving unit is further configured to receive second information and second service description information, where the second information indicates to determine the first application server for the first terminal group, and the second service description information identifies a service accessed by the first terminal group; and the processing unit is specifically configured to determine that the service accessed by the terminal device is the same as the service accessed by the first terminal group.

With reference to the fifth aspect, in some implementations of the fifth aspect, the first service description information or the second service description information includes at least one of the following: a fully qualified domain name (FQDN) and application identifier information.

With reference to the fifth aspect, in some implementations of the fifth aspect, the receiving unit is further configured to receive first area location information, where the first terminal group is located in a first area location indicated by the first area location information; and the processing unit is specifically configured to determine that the terminal device is located in the first area location indicated by the first area location information.

With reference to the fifth aspect, in some implementations of the second aspect, the apparatus further includes: a sending unit, configured to send the second service description information to a second network element; and the processing unit is specifically configured to receive the first information from the second network element.

With reference to the fifth aspect, in some implementations of the fifth aspect, the sending unit is further configured to send the second service description information to a second network element; and the receiving unit is configured to receive third information from the second network element, where the third information is for determining a second application server for the first terminal group.

With reference to the fifth aspect, in some implementations of the fifth aspect, the sending unit is further configured to send the first information to the second network element.

With reference to the fifth aspect, in some implementations of the fifth aspect, the first information includes at least one of the following: a first client subnet option (ECS option), a first data network access identifier (DNAI), and a first application server address (EAS IP).

With reference to the fifth aspect, in some implementations of the fifth aspect, the third information includes at least one of the following: a second client subnet option (ECS option), a second data network access identifier (DNAI), and a second application server address (EAS IP).

With reference to the fifth aspect, in some implementations of the fifth aspect, the sending unit is further configured to send the first area location information to the second network element, where the first terminal group is located in the first area location indicated by the first area location information.

With reference to the fifth aspect, in some implementations of the fifth aspect, the sending unit is further configured to send identification information to the second network element, where the identification information identifies the first terminal group.

With reference to the fifth aspect, in some implementations of the fifth aspect, the receiving unit is further configured to receive fourth information, where the fourth information includes at least one of the following: the first client subnet option (ECS option), the first data network access identifier (DNAI), and the first application server address (EAS IP); and the sending unit is further configured to send the fourth information to a fifth network element.

According to a sixth aspect, a first network element is provided, including: a receiving unit, configured to receive protocol data unit (PDU) session request information, where the PDU session request information includes first service description information, the PDU session request information is for requesting to establish a PDU session, and the first service description information identifies a service accessed by a terminal device; and a processing unit, configured to determine first information in a case that the terminal device belongs to a first terminal group, where the first information is for determining a first application server for a terminal device in the first terminal group.

With reference to the sixth aspect, in some implementations of the sixth aspect, the receiving unit is further configured to receive second information and second service description information, where the second information indicates to determine the first application server for the first terminal group, and the second service description information identifies a service accessed by the first terminal group. The case that the terminal device belongs to the first terminal group includes: the service accessed by the terminal device is the same as the service accessed by the first terminal group.

With reference to the sixth aspect, in some implementations of the sixth aspect, the first service description information or the second service description information includes at least one of the following: a data network name (DNN) and single network slice selection assistance information (S-NSSAI).

With reference to the sixth aspect, in some implementations of the sixth aspect, the receiving unit is further configured to receive first area location information, where the first terminal group is located in a first area location indicated by the first area location information; and the processing unit is specifically configured to determine that the terminal device is located in the first area location indicated by the first area location information.

With reference to the sixth aspect, in some implementations of the second aspect, the apparatus further includes: a sending unit, configured to send the second service description information to a second network element; and the processing unit is specifically configured to receive the first information from the second network element.

With reference to the sixth aspect, in some implementations of the sixth aspect, the sending unit is further configured to send the second service description information to a second network element; and the receiving unit is configured to receive third information from the second network element, where the third information is for determining a second application server for the first terminal group.

With reference to the sixth aspect, in some implementations of the sixth aspect, the sending unit is further configured to send the first information to the second network element.

With reference to the sixth aspect, in some implementations of the sixth aspect, the first information includes at least one of the following: a first client subnet option (ECS option), a first data network access identifier (DNAI), and a first application server address (EAS IP).

With reference to the sixth aspect, in some implementations of the sixth aspect, the third information includes at least one of the following: a second client subnet option (ECS option), a second data network access identifier (DNAI), and a second application server address (EAS IP).

With reference to the sixth aspect, in some implementations of the sixth aspect, the sending unit is further configured to send the first area location information to the second network element, where the first terminal group is located in the first area location indicated by the first area location information.

With reference to the sixth aspect, in some implementations of the sixth aspect, the sending unit is further configured to send identification information to the second network element, where the identification information identifies the first terminal group.

With reference to the sixth aspect, in some implementations of the sixth aspect, the receiving unit is further configured to receive fourth information, where the fourth information includes at least one of the following: the first client subnet option (ECS option), the first data network access identifier (DNAI), and the first application server address (EAS IP); and send the fourth information to a fifth network element.

According to a seventh aspect, a second network element is provided, including: a receiving unit, configured to receive second service description information sent by a first network element, where the second service description information identifies a service accessed by a first terminal group: a processing unit, configured to determine first information based on a correspondence between the second service description information and the first information; and a sending unit, configured to send the first information to the first network element, where the first information is for determining a first application server for the first terminal group.

With reference to the seventh aspect, in some implementations of the seventh aspect, the receiving unit is further configured to receive the first information sent by the first network element.

With reference to the seventh aspect, in some implementations of the seventh aspect, the processing unit is further configured to obtain the correspondence between the second service description information and the first information from a fourth network element.

With reference to the seventh aspect, in some implementations of the seventh aspect, the first information includes at least one of the following: a first client subnet option (ECS option), a first data network access identifier (DNAI), and a first application server address (EAS IP).

With reference to the seventh aspect, in some implementations of the seventh aspect, the receiving unit is further configured to receive first area location information sent by the first network element, where the first terminal group is located in a first area location indicated by the first area location information.

With reference to the seventh aspect, in some implementations of the seventh aspect, the receiving unit is further configured to receive identification information sent by the first network element, where the identification information identifies the first terminal group.

With reference to the seventh aspect, the second service description information includes at least one of the following: a fully qualified domain name (FQDN), a data network name (DNN), application identifier information, and single network slice selection assistance information (S-NSSAI).

According to an eighth aspect, a third network element is provided, including: a sending unit, configured to send second information and second service description information, where the second service description information identifies a service accessed by a first terminal group, and the second information indicates to determine a first application server for the first terminal group.

With reference to the eighth aspect, in some implementations of the eighth aspect, the second service description information includes at least one of the following: a fully qualified domain name (FQDN), a data network name (DNN), application identifier information, and single network slice selection assistance information (S-NSSAI).

With reference to the eighth aspect, in some implementations of the eighth aspect, the sending unit is further configured to send fourth information, where the fourth information includes at least one of the following: a first client subnet option (ECS option), a first data network access identifier (DNAI), and a first application server address (EAS IP).

According to a ninth aspect, an apparatus for determining an application server is provided, including a first network element, a second network element, and a third network element. The first network element is configured to perform the method according to the first aspect or the method according to the second aspect. Alternatively, the second network element is configured to perform the method according to the third aspect. Alternatively, the third network element is configured to perform the method according to the fourth aspect.

According to a tenth aspect, a computer-readable storage medium is provided. The computer-readable storage medium stores program instructions. When the instructions are executed, a first network element is enabled to perform the method according to the first aspect or the method according to the second aspect. Alternatively, when the instructions are executed, the second network element is enabled to perform the method according to the third aspect. Alternatively, when the instructions are executed, the third network element is enabled to perform the method according to the fourth aspect.

According to an eleventh aspect, a chip system is provided, including at least one processor, where the at least one processor is configured to execute stored instructions, so that a first network element can perform the method according to the first aspect or the method according to the second aspect. Alternatively, the at least one processor is configured to execute stored instructions, so that the second network element can perform the method according to the third aspect. Alternatively, the at least one processor is configured to execute stored instructions, so that the third network element can perform the method according to the fourth aspect.

According to a twelfth aspect, a system is provided. The system includes the first network element according to the fifth aspect or the sixth aspect, and/or the second network element according to the seventh aspect, and/or the third network element according to the eighth aspect.

DESCRIPTION OF EMBODIMENTS

The following describes technical solutions of this application with reference to the accompanying drawings.

A wireless communication system mentioned in embodiments of this application includes but is not limited to a global system for mobile communications (GSM) system, a long term evolution (LTE) frequency division duplex (FDD) system, an LTE time division duplex (TDD) system, an LTE system, a long term evolution-advanced (LTE-A) system, a next-generation communication system (for example, a 6G communication system), a system integrating a plurality of access systems, or an evolved system.

The technical solutions provided in this application may be further applied to machine type communication (MTC), a long-term evolution machine communication technology (LTE-M), a device to device (D2D) network, a machine to machine (M2M) network, an internet of things (IoT) network, or another network. The IoT network may include, for example, an internet of vehicles. Communication modes in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, vehicle to network (V2N) communication, and the like.

A terminal device in embodiments of this application may include various access terminals, mobile devices, user terminals, or user apparatuses that have a wireless communication function. For example, the terminal device may be user equipment (UE), such as a mobile phone, a tablet computer (Pad), a computer with a wireless transceiver function, a virtual reality (VR) terminal device, an augmented reality (AR) terminal device, or the like. The terminal device may alternatively be a wireless terminal in industrial control, a machine type communication (MTC) terminal, customer premise equipment (CPE), a wireless terminal in self-driving, a wireless terminal in remote medical, a wireless terminal in a smart grid, a wireless terminal in transportation safety, a wireless terminal in a smart city, a smart home, a cellular phone, a cordless phone, a session initiation protocol (SIP) phone, a wireless local loop (WLL) station, a personal digital assistant (PDA), a handheld device or a computing device with a wireless communication function, another processing device, vehicle-mounted device, wearable device connected to a wireless modem, a terminal device in a 5G network, a terminal device in a future evolved public land mobile network (PLMN), or the like.

Figure 1:
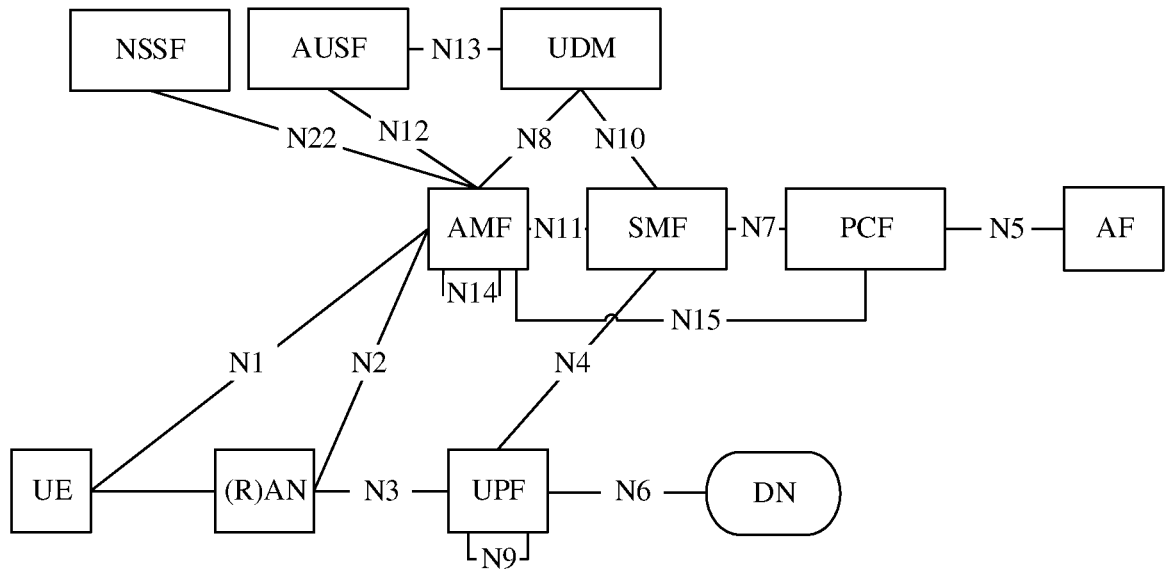
FIG. 1 is a diagram of a system architecture to which an embodiment of this application is applicable.
Figure 2:
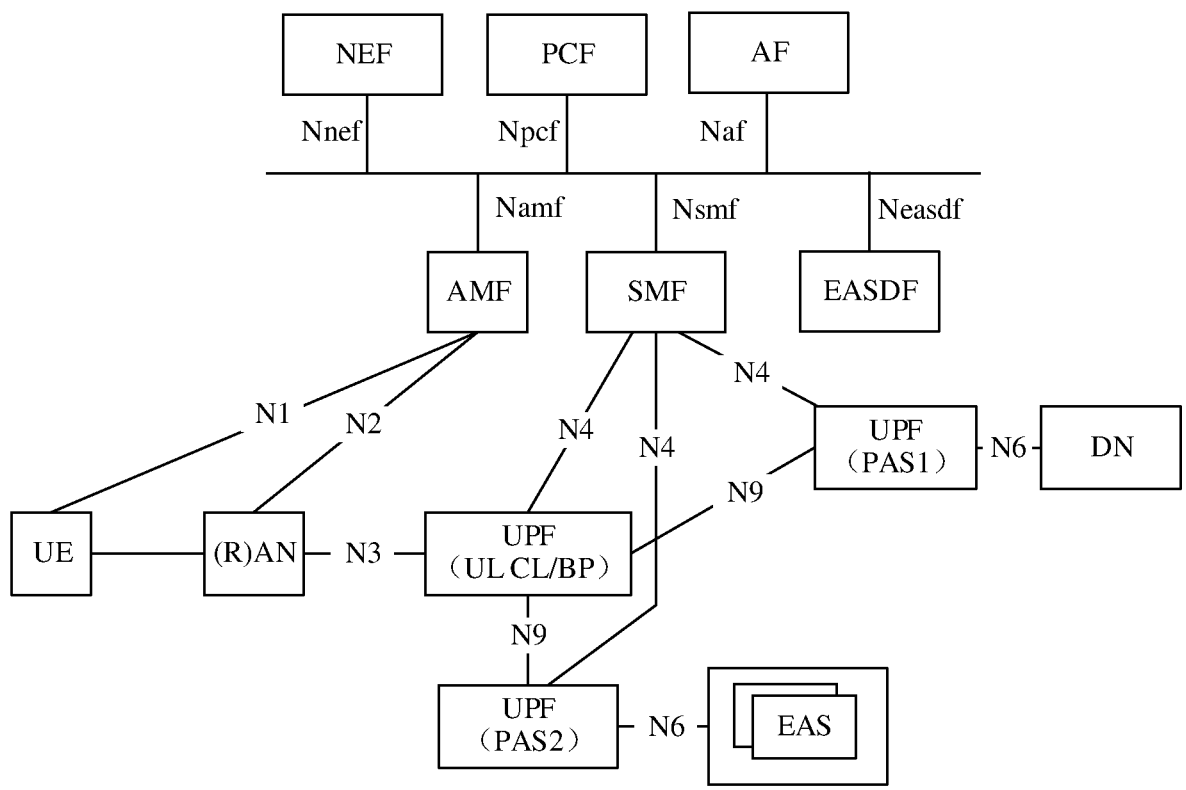
FIG. 2 is a schematic diagram of an edge service architecture according to an embodiment of this application.

With reference to FIG. 1 and FIG. 2, the following describes in detail a network system architecture and an edge service architecture in the architecture in embodiments of this application.

FIG. 1 is a diagram of a system architecture to which an embodiment of this application is applicable. As shown in the figure, the network architecture may specifically include the following network elements:

1. Radio access network (RAN): The radio access network is an access network that implements a network access function based on a wireless communication technology may be referred to as a radio access network. The radio access network can manage radio resources, provide an access service for a terminal, and further complete forwarding of a control signal and user data between a terminal and a core network.

A radio access network device involved in this application may be a device with a wireless transceiver function. The radio access network device may be a device that provides a wireless communication function service, is usually located on a network side, and includes but is not limited to a next generation NodeB (gNodeB, gNB) in a $5^{th}$ generation (5G) communication system, a next generation NodeB in a $6^{th}$ generation (6G) mobile communication system, a base station in a future mobile communication system, an access node in a Wi-Fi system, an evolved NodeB (evolved nodeB, eNB) in an LTE system, a radio network controller (RNC), a NodeB (nodeB, NB), a base station controller (BSC), a home base station (for example, a home evolved NodeB, or a home NodeB, HNB), a baseband unit (base band unit, BBU), a transmission reception point (TRP), a transmission point (TP), a base transceiver station (BTS), and the like. In a network structure, the access network device may include a central unit (CU) node, a distributed unit (DU) node, a RAN device including a CU node and a DU node, or a RAN device including a CU-control plane node, a CU-user plane node, and a DU node. The access network device may serve a cell. User equipment communicates with a base station on a transmission resource (for example, a frequency domain resource, or in other words, a frequency spectrum resource) used for the cell. The cell may be a cell corresponding to the base station (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are applicable to providing a high-speed data transmission service. The radio access network device may be a macro base station, may be a micro base station or an indoor base station, or may be a relay node or a donor node, a device that provides a wireless communication service for user equipment in a V2X communication system, a radio controller in a cloud radio access network (CRAN) scenario, a relay station, a vehicle-mounted device, a wearable device, a network device in a future evolved network, or the like. A specific technology and a specific device form used by the wireless access network device are not limited in embodiments of this application.

2. Authentication service function (AUSF) network element: The authentication service function network element is mainly used for user authentication and the like.
3. An access and mobility management function (AMF) network element: The access and mobility management function network element is mainly configured to perform mobility management, access management, and the like, and may be configured to implement other functions in a mobility management entity (MME) function other than session management, for example, lawful interception, access authorization (or authentication), and the like. In embodiments of this application, the access and mobility management network element may be configured to implement functions of an access and mobility management network element.
4. Session management function (SMF) network element: The session management function network element is mainly used for session management, terminal device internet protocol (IP) address allocation and management, manageable user plane function selection, termination of interfaces toward policy control or charging functions, downlink data notification, and the like. In embodiments of this application, the session management network element may be configured to implement functions of a session management network element.
5. Policy control function (PCF) network element: The policy control function network element supports a unified policy framework to govern network behavior, and provides policy rule information and the like for control plane function network elements (for example, an AMF and SMF network element).
6. Application function (AF) network element: The application function network element is configured for application influence on traffic routing, accessing a network exposure function network element, interacting with a policy framework to perform policy control, and the like.
7. Unified data management (UDM) network element: The unified data management network element is used for unified data management, 5G subscriber data management, subscriber identification handling, access authentication, registration, mobility management, and the like.
8. User plane function (UPF) network element: The user plane function network element may be configured to perform packet routing and forwarding, quality of service (QOS) handling of user plane data, and the like. User data may be accessed to a data network (DN) through this network element. In embodiments of this application, the user plane function network element may be configured to implement functions of a user plane network element.
9. Network slice selection function (NSSF) network element: The network slice selection function network element is configured to manage information related to network slices.

10. Data network (DN): The digital network is a network for data transmission, for example, an operator service network, the Internet, a third-party service network, or the like.

In addition, the network architecture further includes a network repository function (NRF) network element, configured to store network function entities and description information of services provided by the network function entities, and support functions such as service discovery, network element entity discovery, and the like: a network exposure function (NEF) network element, configured to securely expose services, capabilities, and the like that are provided by a $3^{rd}$ generation partnership project (3GPP) network function; and a unified data repository (UDR) function network element, used for storage of subscription data or reading of subscription data by the UDM and storage of policy data or reading of policy data by the PCF.

In this network architecture, an N2 interface is an interface between the RAN and the AMF network element, and is for sending a non-access stratum (NAS) message and the like: an N3 interface is an interface between the RAN and the UPF network element, and is for transmitting user plane data and the like; and an N4 interface is an interface between the SMF network element and the UPF network element, and is for transmitting tunnel identification information of an N3 connection, data buffer indication information, a downlink data notification message, and the like.

It should be understood that the foregoing network architecture applied to embodiments of this application is merely a network architecture described from the perspective of a conventional point-to-point architecture and a service-based architecture by using an example. A network architecture applicable to embodiments of this application is not limited thereto. Any network architecture that can implement functions of the foregoing network elements is applicable to embodiments of this application.

It should be understood that names of interfaces between network elements in FIG. 1 are merely examples, and names of interfaces during specific implementation may be other names. This is not specifically limited in this application. In addition, a name of a message (or signaling) transmitted between the foregoing network elements is merely an example, and does not constitute any limitation on a function of the message.

FIG. 2 is a schematic diagram of a system architecture or a scenario in which an edge computing service is deployed in a 5G network architecture. The system may also be considered as introducing support for edge computing in the foregoing 5G network architecture.

As shown in FIG. 2, the system architecture includes an edge application server (EAS). The EAS is an edge application server deployed in an edge data network (EDN), and may also be referred to as an edge application (server), an application instance, an edge application instance, a multi-access edge computing (MEC) application (server), an EAS function, or the like. The edge application may also be referred to as an "application instance", and is specifically an instance of a server application program (for example, social media software, augmented reality (AR), or virtual reality (VR)) that is deployed and runs in the EDN. One or more EASs may be deployed for one application in one or more EDNs. EASs deployed and running in different EDNs may be considered as different EASs of one application. The EASs may share one domain name, or may use domain names different from that of an application deployed on cloud, where the domain name may be a fully qualified domain name (FQDN); and may use one anycast internet protocol (IP) address, or may use different IP addresses.

The edge data network may be a local data network. The local DN may be identified by a data network access identifier (DNAI) and a data network name (DNN), and is a logical network concept.

The system architecture further includes an edge application server discovery function (EASDF) network element. The EASDF may include one or more of the following functions:

registering with an NRF for EASDF discovery and selection; and processing a domain name system (DNS) message based on an indication of an SMF, including receiving a DNS message processing rule from the SMF, exchanging a DNS message from UE, and forwarding the DNS message to a central DNS (C-DNS) resolver/server or a local DNS (L-DNS) resolver/server for DNS query. In addition, the EASDF may further establish a user plane connection to a UPF through an N6 interface, to transmit DNS signaling exchanged with the UE. The EADSF can be directly connected to one or more local DNs. A DNS server (resolver/server) may be locally deployed by a 5GC operator or a third party including a local DN, and is configured to resolve a DNS query of the UE to an appropriate EAS IP address in the local DN. The DNS server can be deployed at different locations in the network as a central DNS (C-DNS) server or a local DNS (L-DNS) server. The L-DNS may or may not be connected to the C-DNS, depending on the deployment.

When a terminal device has service transmission, the SMF may establish a plurality of protocol data unit (PDU) sessions to a same DN or different DNs. When a plurality of PDU sessions to a same DN are established, different UPFs need to be used. The SMF can control PDU data routing so that the PDU sessions can have a plurality of N6 interfaces. A UPF connected to each N6 interface is referred to as a PDU session anchor (PSA) UPF. Each PAS provides a different path to the same DN.

For different types of PDU sessions, the SMF may insert an uplink classifier (UL CL) into a data transmission path of the PDU session. A function of the UL CL is provided by a UPF, to forward a data packet that meets a service filtering rule to a designated path. When a UL CL is inserted into a data channel of a PDU session, the PDU session may have a plurality of PDU session anchors, providing a plurality of different paths to a same DN. In other words, the function of the UL CL may be transmitting uplink data to different PSAs, and combining downlink data to the UE. Alternatively, data corresponding to all PSAs may be aggregated to a common UPF, and the common UPF has a function of a branching point (BP). The branching point forwards uplink data to different PSAs in an uplink direction and combines downlink data from PSAs in a downlink direction.

In the system architecture shown in FIG. 2, the UPF (UL CL/BP) may represent a UPF that provides a UL CL function or a common UPF. To be specific, the UPF may transmit uplink data to different PSAs, for example, a UPF (PSA2) and a UPF (PSA1), and combine downlink data to the UE.

The foregoing content briefly describes a system architecture and a possible application scenario in embodiments of this application. To better understand the technical solutions in embodiments of this application, before embodiments of this application are described, nouns or terms in this application are first briefly described.

(1) Data network name (DNN): The data network name may be used to select an SMF and a UPF for establishing a protocol data unit (PDU) session, or may be used to determine a policy applied to the PDU session. A DNN consists of two parts: (1) a network identifier (ID), which indicates an external network, and is mandatory, and (2) a carrier ID, which indicates a carrier to which the DNN belongs, and is optional.

(2) Single network slice selection assistance information (S-NSSAI): The single network slice selection assistance information uniquely identifies a network slice and may include one or more data network names DNNs for an AMF to select. The DNN specifies an SMF selected for a PDU session. NSSAI is an S-NSSAI set and can identify a group of network slices. UE can select a corresponding slice group (including an AMF/SMF/UPF) through the S-NSSAI when performing services. When UE initiates an attach (attach) procedure, the UE provides S-NSSAI information. A gNB selects a 5G core network (5GC) based on the S-NSSAI information. If the UE does not provide related S-NSSAI information, the gNB routes NAS information of the UE to a default 5GC.

Figure 3:
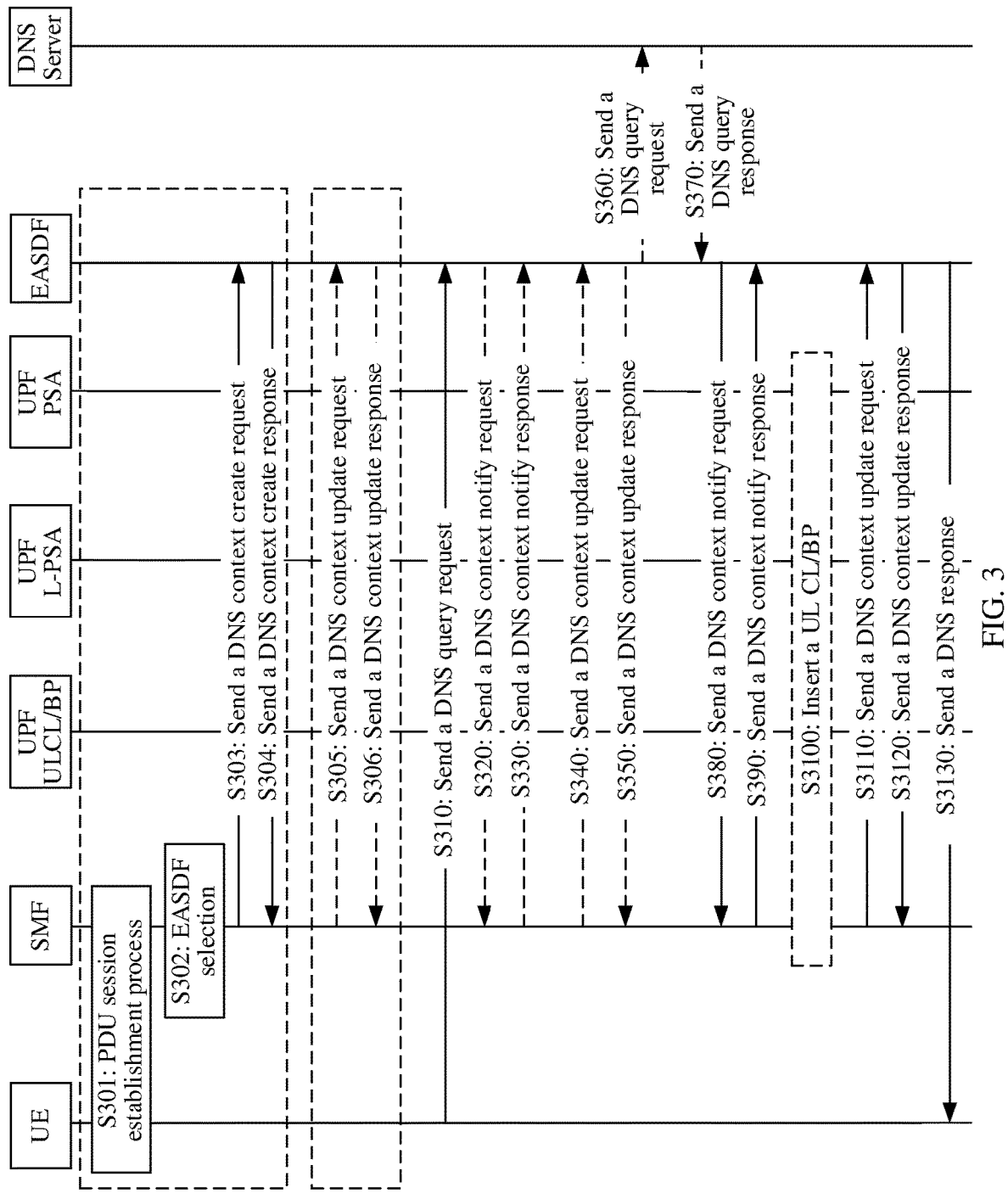
FIG. 3 is a schematic flowchart of an existing edge service obtaining method.

It should be noted that, to use an edge application, a terminal device needs to obtain an IP address of an EAS by using a DNS-based service discovery mechanism. As shown in FIG. 3, the terminal device may obtain the IP address of the EAS in the following steps:

S301: Perform a process of establishing a PDU session.

The process of establishing the PDU session includes establishing a session of a user plane path between the UE and a UPF. A specific procedure is in a conventional technology. Details are not described herein.

S302: In the process of establishing the PDU session, an SMF selects an EASDF.

S303: The SMF sends a DNS context create request (Neasdf_DNSContext_Create Request) to the selected EASDF. The DNS context create request may include an IP address of the terminal device, a callback URI, and a DNS message processing rule. The EASDF may create a DNS context for the PDU session based on the request message, and store the IP address of the UE, the callback URI, and the DNS message processing rule in the context.

Correspondingly, in S304, the EASDF sends a DNS context create response to the SMF.

S305: The SMF sends a DNS context update request (Neasdf_DNSContext_UpdateRequest) to the EASDF.

The update request message may be triggered by mobility of the terminal device, or the update request message may be triggered by insertion or removal of a PSA. The update request message may include an EASDF context ID and the DNS message processing rule.

Correspondingly, in S306, the EASDF sends a DNS context update response to the SMF.

S310: The terminal device sends a DNS query message to the EASDF.

S320: If the DNS query message matches the DNS message processing rule that is for reporting, the EASDF sends a DNS message report to the SMF by invoking a DNS context notify request (Neasdf_DNSContext_Notify Request).

S330: The SMF sends a DNS context notify response (Neasdf_DNSContext_Notify Response) to the EASDF.

Optionally, if a DNS message handling rule for an FQDN received in the report needs to be updated, for example, update information is provided to build EDNS client subnet option (ECS) information, in S340, the SMF sends a DNS context update request (Neasdf_DNSContext_Update Request) to the EASDF. The update request may include the DNS message processing rule.

The ECS (EDNS-Client-Subnet) is a new protocol supported by a DNS service. According to this protocol, an IP address of a user is added to a DNS request packet. In this way, the DNS server can return an IP address of a nearer server to the user based on the IP address of the user instead of an IP address of a recursive server, so that the user can access the nearer server.

Correspondingly, in S340, the EASDF sends a DNS context update response (Neasdf_DNSContext_Update Response) to the SMF.

S350: The EASDF handles the received DNS query message.

The EASDF may add an ECS option to the DNS query message, and send the DNS query message to a C-DNS server. Alternatively, the EASDF may send the DNS query message to a local DNS server.

S360: The EASDF sends the DNS query request to the DNS server.

S370: The EASDF receives a DNS response sent by the DNS server.

S380: The EASDF sends a DNS message report to the SMF by triggering a DNS context notify request (Neasdf_DNSContext_Notify request).

S390: The SMF sends a DNS context notify response (Neasdf_DNSContext_Notify Response) to the EASDF.

Optionally, in S3100, the SMF may further insert a UL CL/BP.

Based on EAS information (for example, an EAS IP address) received from the EASDF, the SMF may determine a DNAI and associated N6 traffic routing information of the DNAI. The SMF may perform selection and insertion of the UL CL/BP and a local PSA to complete establishment of a data plane path for the UE.

After the data plane path for the UE is established, in S3110, the SMF may send a DNS context update request (Neasdf_DNSContext_Update Request) to the EASDF. The request message may include the DNS message processing rule.

Correspondingly, in S3120, the EASDF sends a DNS context update response (Neasdf_DNSContext_Update Response) to the SMF.

S3130: The EASDF sends a DNS response message to the terminal device.

Currently, in edge computing services, some new application scenarios emerge. These scenarios require that one or more terminal devices in a location range of a geographical area can access a same edge application server (EAS) when accessing a same service or a specific service. For example, in the following scenario: an augmented reality (AR) scenario, a plurality of users play an interactive AR game together, and when the plurality of users are in a same location area, all the users are connected to a same EAS server; and in an internet of vehicles (V2X) scenario, vehicles in a same road section exchange road condition information, to ensure that all vehicles are connected to a same EAS server.

In view of this, this application provides an application server selection method, so that a same EAS server can be selected for terminal devices that access a specific (same) service and that are in a specific location area.

It may be understood that the edge application server EAS may also be referred to as an application server, an application instance, an edge application instance, a multi-access edge computing (MEC) application (server), an EAS function, or the like. For ease of description, in embodiments of this application, the edge application server is uniformly described as an application server (EAS).

The following describes in detail a method provided in embodiments of this application with reference to the accompanying drawings. It should be noted that, in the following process of describing embodiments with reference to the accompanying drawings, the figures are merely for ease of understanding, and shall not constitute any limitation on this application. Names of the network elements are defined only for distinguishing different functions, and shall not constitute any limitation on this application. This application does not exclude a possibility of defining another network element to implement a same or similar function.

Figure 4:
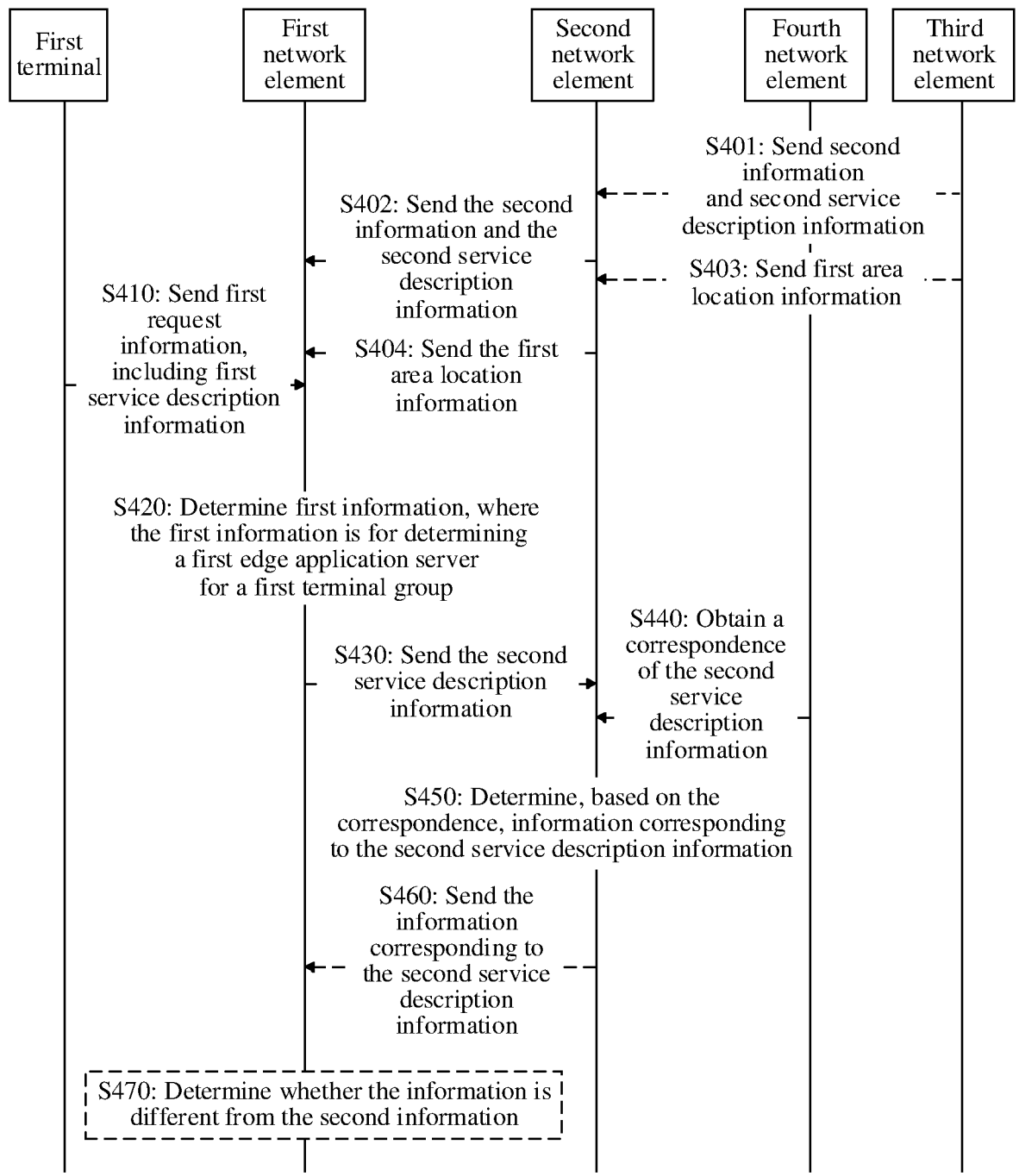
FIG. 4 is a schematic flowchart of a method for determining an application server according to an embodiment of this application.

FIG. 4 is a schematic flowchart of a method for determining an application server according to an embodiment of this application. The method includes at least the following steps.

S410: A terminal device sends first request information to a first network element, where the first request information includes first service description information, the first service description information identifies a service accessed by the terminal device, and the first request information is for requesting to determine first information for the terminal device.

S420: In a case that the terminal device belongs to a first terminal group, the first network element determines first information, where the first information is for determining a first application server (first EAS) for the first terminal group.

Specifically, the first network element may be a session management SMF network element, the first request information is not equivalent to DNS query information, and the first request information may be specific information content in the DNS query information (DNS query). The first request information includes the first service description information. The first service description information may be fully qualified domain name (FQDN) information, or may be application identifier information (Application Identifier), or may be an FQDN and application identifier information. It should be understood that this is not limited in this embodiment of this application.

The first network element determines the first information when determining that the terminal device belongs to the first terminal group. It should be understood that the first information may be first ECS option information, first DNAI information, or first EAS IP information. This is not limited in this embodiment of this application.

It should be noted that, the first network element may determine, in some manner, that the terminal device belongs to the first terminal group. For example, the first network element may determine, based on whether the service accessed by the terminal device is the same as a service accessed by the first terminal group, whether the terminal device belongs to the first terminal group; or may determine, based on whether an area location of the terminal device is the same as an area location of the first terminal group, whether the terminal device belongs to the first terminal group. It should be understood that a manner of determining that the terminal device belongs to the first terminal group is not limited herein in this embodiment of this application.

It should be further noted that the first terminal group is a user group including a plurality of terminal devices that access a same (specific) service and use a same EAS (application server). To be specific, a 5GC groups the plurality of terminal devices into one first terminal group based on a same service requirement of the terminal devices, and selects a same EAS for a dynamic UE group. In this application, an application server accessed by a terminal in the first terminal group may be referred to as a first application server or a second application server.

It may be understood that the first terminal group may be a real group, and the first terminal group includes at least one terminal device. As described above, for example, all terminal devices in the first terminal group access a same service. The first terminal group may alternatively be a virtual group, that is, the first terminal group herein refers to one or more terminal devices that access a same service, and is not a true group, but is considered as a terminal group because the one or more terminal devices access a same service. In this embodiment of this application, the same server accessed by the terminal device in the first terminal group may be the first application server or the second application server. It should be understood that this is not limited in this embodiment of this application.

Before S410, optionally, the method may further include S401 and S402. S401: A third network element sends second information and second service description information to a second network element, and correspondingly, the second network element receives the second information and the second service description information. S402: The second network element sends the second information and the second description information to the first network element, and correspondingly, the first network element receives the second information and the second description information.

Specifically, the second network element may be a policy management function (PCF) network element, or may be a network exposure function (NEF) network element, and the third network element may be an application function (AF) network element. The second service description information identifies the service accessed by the first terminal group, and the second information indicates to determine the first application server (first EAS) for the first terminal group. It should be understood that the second service description information may be an FQDN, or may be application identifier information (Application Identifier), or may be an FQDN and application identifier information. It should be understood that this is not limited in this embodiment of this application.

It should be noted that, in this embodiment of this application, that the second service description information identifies the service accessed by the first terminal group may be understood as that the second service description information identifies a service accessed by a terminal device in the first terminal group. For example, if there is one terminal device in the first terminal group, the service accessed by the first terminal group is equivalent to a service accessed by the terminal device; if there are a plurality of terminal devices in the first terminal group, the service accessed by the first terminal group is equivalent to a service accessed by the plurality of terminal devices.

It should be further noted that, in a possible implementation, the second information may include a field having an explicit indication (or representation, or suggestion) function. After receiving the second information, the first network element determines the first application server for the terminal device that is in the first terminal group and that accesses the service. In another possible implementation, the second information may alternatively include a specific field that has an implicit indication. To be specific, the second information is implicitly included in a message. For example, indication of the second information is implicitly provided by using a field name, and specific content in the field is service description information, location information, and the like.

It may be understood that the service description information may also be referred to as service identification information, service information, identification information, or the like. It should be understood that this is not limited in this embodiment of this application.

It should be understood that the second description information may also be carried in the second information, that is, the second information may include the second description information. This is not limited in this embodiment of this application.

In S420, when the terminal device belongs to the first terminal group, the first network element determines the first information, where the first information is for determining the first application server (first EAS) for the first terminal group. Because the first terminal group includes the terminal device, it may also be understood that the first information is for determining the first EAS for the terminal device.

In a possible implementation, when the service accessed by the terminal device is the same as the service accessed by the first terminal group, the first network element determines that the terminal device belongs to the first terminal group.

Specifically, the first network element determines, based on the received first service description information, the service accessed by the terminal device, and determines, based on the second service description information, the service accessed by the first terminal group. If the service accessed by the terminal device is the same as the service accessed by the first terminal group, the first network element determines that the terminal device belongs to the first terminal group. In this case, the first network element determines the first information for the first terminal group based on indication of the second information. That the first network element determines the first information for the first terminal group may also be understood as that the first network element determines the first information for a terminal device that belongs to the first terminal group.

For example, if the first service description information identifies a service A, and the second service description information also identifies the service A, the first network element determines, based on that the service accessed by the terminal device (UE 1) is the same as the service of the first terminal group, that the UE 1 belongs to the first terminal group. In this case, the first network element determines the first information. If the first service description information identifies the service A, and the second service description information identifies a service B, the first network element determines, based on that the service accessed by the terminal device (UE 1) is different from the service of the first terminal group, that the UE 1 does not belong to the first terminal group.

The determining the first information may be understood as: if there is no first information for the first terminal group currently, selecting, by the first network element, one piece of first information: or if the first information for the first terminal group already exists currently, using, by the first network element, the existing first information.

Optionally, before S410, the method may further include S403 and S404. S403: The third network element sends first area location information to the second network element, and correspondingly, the second network element receives the first area location information. S404: The second network element sends the first area location information to the first network element, and correspondingly, the first network element receives the first area location information. It should be understood that the first area location information may be coordinate information, cell ID information, or the like. This is not limited in this embodiment of this application.

In a possible implementation, when both the terminal device and the first terminal group are located in a first area location indicated by the first area location information, the first network element determines that the terminal device belongs to the first terminal group.

Specifically, the first network element determines, based on the received first area location information, that the first terminal group is located in the first area location indicated by the first area location information, and the first network element obtains location information of the terminal device. If the first network element determines that the terminal device is also located in the first regional location, the first network element determines that the terminal device belongs to the first terminal group. In this case, the first network element determines the first information for the first terminal group based on the indication of the second information, that is, the first network element determines the first information for the terminal device that belongs to the first terminal group.

In a possible implementation, the first network element receives the second service description information, the first area location information, and the second information. Similarly, the first network element obtains the location information of the terminal device, and when the service accessed by the terminal device is the same as the service accessed by the first terminal group and the terminal device is located in the first area location indicated by the first area location information, the first network element determines that the terminal device belongs to the first terminal group. In this case, the first network element determines the first information for the first terminal group based on the indication of the second information, that is, the first network element determines the first information for the terminal device that belongs to the first terminal group.

For example, the first network element determines, based on the received second service description information, that the first terminal group accesses the service A. Similarly, the first network element further determines, based on indication of the received first area location information, that the area location of the first terminal group is an area I. In this case, the first network element learns that the terminal device (UE 1) accesses the service A and a location reported by the UE 1 is an area i, where a geographical range of the area I includes a geographical range of the area i. In this case, the first network element determines, based on that the service accessed by the UE 1 is the same as the service accessed by the first terminal group, and the terminal device is located in the area location in which the first terminal group is located, that the UE 1 belongs to the first terminal group, and determines the first information for the first terminal group, that is, the first network element determines the first information for the terminal device that belongs to the first terminal group.

It may be understood that, that the terminal device is located in the area location in which the first terminal group is located may be understood as that an area location in which the terminal device is located is the same as the area location in which the first terminal group is located, or may be understood as that a geographical range of the area location in which the first terminal group is located includes a geographical range of the area location in which the terminal device is located.

Optionally, the method may further include S430 to S470.

S430: The first network element sends the second service description information to the second network element, and correspondingly, the second network element receives the second service description information from the first network element.

S440: The second network element obtains a correspondence of the second service description information from a fourth network element, where the fourth network element may be a UDR.

S450: The second network element determines, based on the correspondence, information corresponding to the second service description information.

S460: The second network element sends the information corresponding to the second service description information to the first network element, and correspondingly, the first network element receives the information corresponding to the second service description information from the second network element.

S470: The first network element determines whether the information corresponding to the received second service description information is different from the determined second information.

In a possible implementation, the second network element determines, based on the received second service description information and the correspondence that is of the second service description information and that is obtained from the fourth network element, that the information corresponding to the second service description information is first information, and returns the first information to the first network element. In this case, if the first network element determines that the returned first information is the previously determined first information, the first network element determines the second information for the first terminal group.

For example, the first information is an ECS option. The first network element determines, based on the second service description information (for example, information 1) and the indication of the second information, that the first information corresponding to the first terminal group is an ECS option 1. The first network element sends the information 1 to the second network element. The second network element obtains a correspondence between the information 1 and the first information (ECS option 1). In this case, the second network element returns the ECS option1 to the first network element, and the first network element determines that the returned ECS option 1 is the previously determined ECS option 1. In this case, the first network element determines, for the first terminal group, that the first information is the ECS option 1. In other words, the first network element determines, for the terminal device that belongs to the first terminal group, that the first information is the ECS option1, where the ECS option 1 is used to select an EAS 1 as an application server of the terminal device that accesses a service.

It may be understood that, when the first information is a DNAI or an EAS IP, a specific case is similar to a case in which the first information is an ECS option. For brevity, details are not described in this application again.

In a possible implementation, the second network element determines, based on the received second service description information and the correspondence that is of the second service description information and that is obtained from the fourth network element, that the information corresponding to the second service description information is third information, and returns the third information to the first network element. In this case, if the first network element determines that the third information is different from the previously determined first information, the first network element re-determines third information for the first terminal group, to replace the originally selected second information. The third information may be second ECS option information, or may be second DNAI information, or may be second EAS IP information. It should be understood that this is not limited in this embodiment of this application.

For example, the first information and the third information are ECS options. The first network element determines, based on the second service description information (for example, the information 1) and the indication of the second information, that the first information corresponding to the first terminal group is the ECS option 1. The ECS option 1 is used to select the EAS 1 as the application server of the terminal device that accesses the service. The first network element sends the information 1 to the second network element. The correspondence obtained by the second network element is a correspondence between the information 1 and the third information (ECS option 2). In this case, the second network element returns the ECS option 2 to the first network element, and the first network element determines that the returned ECS option 2 is different from the previously determined ECS option 1. In this case, the first network element replaces the previously determined ECS option 1 with the ECS option 2, that is, the first network element re-determines that the first information is the ECS option 2 rather than ECS option 1. The ECS option 2 is for determining that a second application server (for example, an EAS 2) is used as the application server of the terminal device that accesses the service. It should be understood that the EAS 2 and the EAS 1 are different application servers.

It may be understood that, when the first information is a DNAI or an EAS IP, a specific case is similar to a case in which the first information is an ECS option. For brevity, details are not described in this application again.

Optionally, in a possible implementation, the method may further include: The first network element sends second information to the second network element while sending the second service description information to the second network element. In one case, if the second network element determines, based on the received second service description information and an obtained correspondence, that there is no information that corresponds to the second service description information. In this case, the second network element records the second information sent by the first network element, and returns the second information to the first network element for confirmation.

Optionally, in a possible implementation, the method may further include: The first network element sends the first area location information to the second network element; and specifically, the second network element determines, based on the received second service description information, the first area location information, and an obtained correspondence, that information corresponding to the second service description information and the first area location information is first information, and returns the first information to the first network element. In this case, if the first network element determines that the returned first information is the previously determined first information, the first network element determines the first information for the first terminal group, that is, determines the first information for the terminal device (where the terminal device belongs to the first terminal group) that accesses the service and that is located in the first area location.

Optionally, in a possible implementation, the method may further include: The second network element determines, based on the received second service description information, the first area location information, and an obtained correspondence, that information corresponding to the second service description information and the first area location information is the third information, and returns the third information to the first network element. In this case, if the first network element determines that the third information is different from the previously determined first information, the first network element re-determines third information for the first terminal group, to replace the originally determined first information, that is, re-determines the third information for the terminal device (where the terminal device belongs to the first terminal group) that accesses a service and that is located in the first area location.

Optionally, in a possible implementation, the method may further include: The first network element sends identification information to the second network element, where the identification information identifies the first terminal group. For example, the identification information may be an identity (identity, ID).

Specifically, for the first terminal group, the third network element sends, to the first network element, the identification information that identifies the first terminal group together with the second information. Then, the first network element forwards the identification information and the second information to the second network element, and the second network element determines, based on the identification information and an obtained corresponding relationship, first information corresponding to the identification information, and returns the first information to the first network element.

Optionally, in a possible implementation, the method further includes: The first network element receives fourth information from the third network element, and sends the fourth information to a fifth network element.

Specifically, the fifth network element may be an EASDF, and the fourth information may include at least one of the following: a first ECS option, a first DNAI, and a first EAS IP. The fourth information is used to configure the EASDF network element.

For example, the fourth information is an ECS option. The terminal device (UE 1) sends DNS query information to the EASDF. The EASDF finds that ECS option information that matches the DNS query information of the UE 1 is the first ECS option, adds the first ECS option to the DNS query information, and then obtains, according to an existing DNS query procedure, that address information of an application server accessed by the UE 1 is address information of the EAS 1.

For example, the fourth information is an EAS IP. The first terminal (UE 1) sends DNS query information to the EASDF. After receiving the DNS query information, the EASDF directly generates DNS response information based on the first EAS IP included in the fourth information provided by the first network element, to return the first EAS IP information to the UE 1.

It may be understood that the foregoing correspondence is not limited to a correspondence between the second service description information and the first information/third information, or may be a correspondence between the first area location information and the first information/third information, or may be a correspondence between the second service description information and the first area location information and the first information/third information, or may be a correspondence between the identification information and the first information/third information. It should be understood that this is not limited in this embodiment of this application.

It should be further understood that the foregoing correspondence may be one-to-one, one-to-many, or many-to-one. This is not limited in this embodiment of this application.

Figure 5:
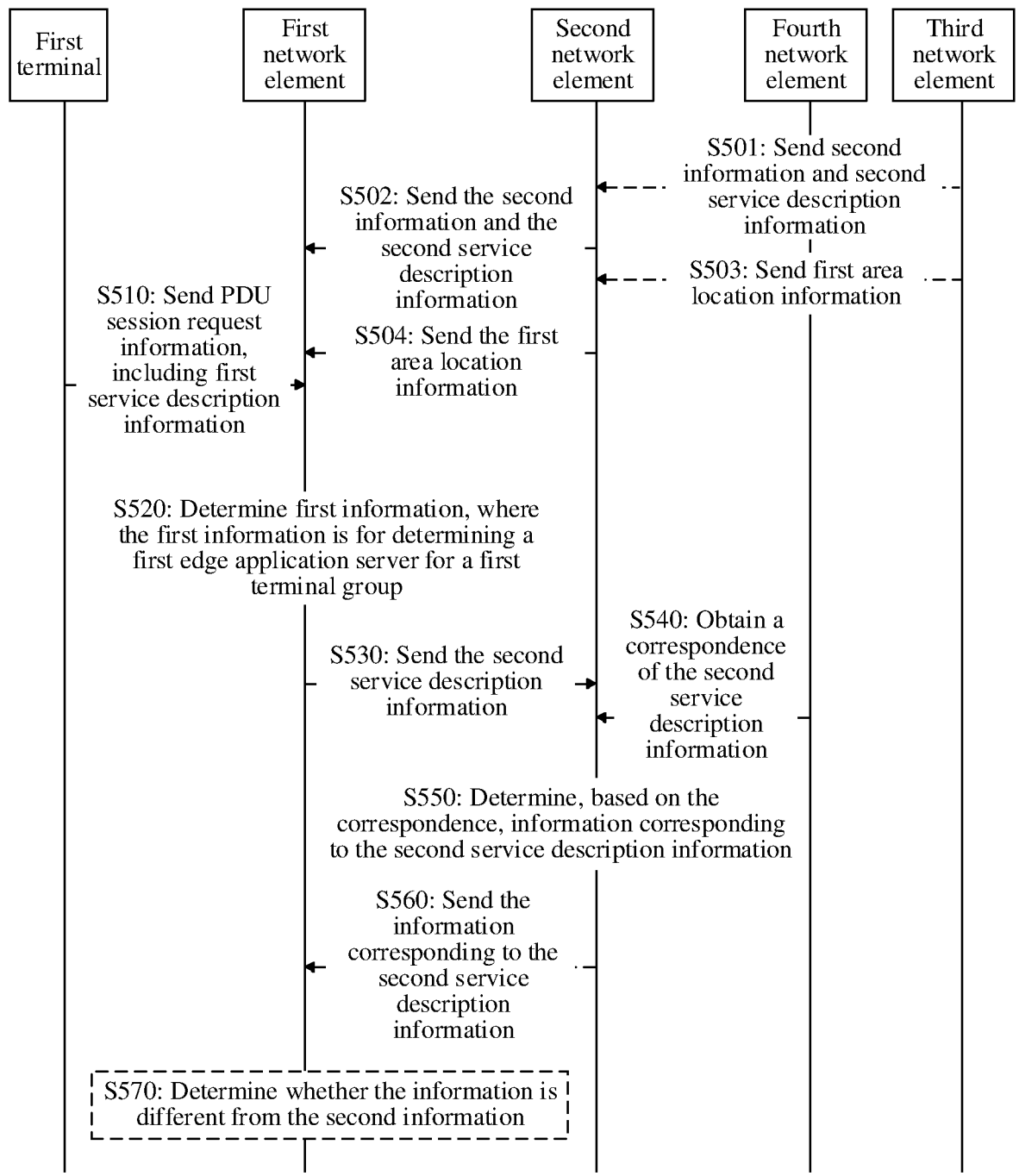
FIG. 5 is a schematic flowchart of a method for determining an application server according to another embodiment of this application.

FIG. 5 is a schematic flowchart of a method for determining an application server according to an embodiment of this application. The method includes at least the following steps.

S510: A first terminal sends PDU session request information to a first network element, where the PDU session request information includes first service description information, and the first service description information identifies a service accessed by a terminal device.

S520: In a case that the terminal device belongs to a first terminal group, the first network element determines first information, where the first information is for determining a first application server (first EAS) for the first terminal group.

Specifically, the first network element may be a session management function SMF network element, the PDU session request information is for requesting to establish a PDU session, and the PDU session request information includes the first service description information. The first service description information may be a data network name DNN, or may be single network slice selection assistance information S-NSSAI, or may be a DNN and S-NSSAI. It should be understood that this is not limited in this embodiment of this application.

The first network element determines the first information when determining that the terminal device belongs to the first terminal group. It should be understood that the first information may be first ECS option information, first DNAI information, or first EAS IP information. This is not limited in this embodiment of this application.

It should be noted that, the first network element may determine, in some manner, that the terminal device belongs to the first terminal group. For example, the first network element may determine, based on whether the service accessed by the terminal device is the same as a service accessed by the first terminal group, whether the terminal device belongs to the first terminal group: or may determine, based on whether an area location of the terminal device is the same as an area location of the first terminal group, whether the terminal device belongs to the first terminal group. It should be understood that a manner of determining that the terminal device belongs to the first terminal group is not limited herein in this embodiment of this application.

It should be further noted that the first terminal group is a user group including a plurality of terminal devices that access a same (specific) service and use a same EAS (application server). To be specific, a 5GC groups the plurality of terminal devices into one first terminal group based on a same service requirement of the terminal devices, and selects a same EAS for a dynamic UE group. In this application, an application server accessed by a terminal in the first terminal group may be referred to as a first application server or a second application server.

It may be understood that the first terminal group may be a real group, and the first terminal group includes at least one terminal device. As described above, for example, all terminal devices in the first terminal group access a same service. The first terminal group may alternatively be a virtual group, that is, the first terminal group herein refers to one or more terminal devices that access a same service, and is not a true group, but is considered as a terminal group because the one or more terminal devices access a same service. In this embodiment of this application, the same server accessed by the terminal device in the first terminal group may be the first application server or the second application server. It should be understood that this is not limited in this embodiment of this application.

It should be understood that the first terminal group may also be referred to as a first user group, a terminal group, a user group, a dynamic UE group, or the like. This is not limited in this embodiment of this application.

Before S510, optionally, the method may further include S501 and S502. S501: A third network element sends second information and second service description information to a second network element, and correspondingly, the second network element receives the second information and the second service description information. S502: The second network element sends the second information and the second description information to the first network element, and correspondingly, the first network element receives the second information and the second description information.

Specifically, the second network element may be a policy management function PCF network element, or may be a network exposure function NEF network element, and the third network element may be an application function AF network element. The second service description information identifies the service accessed by the first terminal group, and the second information indicates to determine the first application server (first EAS) for the first terminal group. It should be understood that the second service description information may be a DNN, or may be S-NSSAI, or may be a DNN and S-NSSAI. It should be understood that this is not limited in this embodiment of this application.

It should be noted that, in this embodiment of this application, that the second service description information identifies the service accessed by the first terminal group may be understood as that the second service description information identifies a service accessed by a terminal device in the first terminal group. For example, if there is one terminal device in the first terminal group, the service accessed by the first terminal group is equivalent to a service accessed by the terminal device; if there are a plurality of terminal devices in the first terminal group, the service accessed by the first terminal group is equivalent to a service accessed by the plurality of terminal devices.

It should be further noted that, in a possible implementation, the second information may include a field having an explicit indication (or representation, or suggestion) function. After receiving the second information, the first network element determines the first application server for the terminal device that is in the first terminal group and that accesses the service. In another possible implementation, the second information may alternatively include a specific field that has an implicit indication. To be specific, the second information is implicitly included in a message. For example, indication of the second information is implicitly provided by using a field name, and specific content in the field is service description information, location information, and the like.

It may be understood that the service description information may also be referred to as service identification information, service information, identification information, or the like. It should be understood that this is not limited in this embodiment of this application.

It should be understood that the second description information may also be carried in the second information, that is, the second information may include the second description information. This is not limited in this embodiment of this application.

In S520, when the terminal device belongs to the first terminal group, the first network element determines the first information, where the first information is for determining the first application server (first EAS) for the first terminal group. Because the first terminal group includes the terminal device, it may also be understood that the first information is for determining the first EAS for the terminal device.

In a possible implementation, when the service accessed by the terminal device is the same as the service accessed by the first terminal group, the first network element determines that the terminal device belongs to the first terminal group.

Specifically, the first network element determines, based on the received first service description information, the service accessed by the terminal device, and determines, based on the second service description information, the service accessed by the first terminal group. If the service accessed by the terminal device is the same as the service accessed by the first terminal group, the first network element determines that the terminal device belongs to the first terminal group. In this case, the first network element determines the first information for the first terminal group based on indication of the second information. That the first network element determines the first information for the first terminal group may also be understood as that the first network element determines the first information for a terminal device that belongs to the first terminal group.

For example, if the first service description information identifies a service A, and the second service description information also identifies the service A, the first network element determines, based on that the service accessed by the terminal device (UE1) is the same as the service of the first terminal group, that the UE1 belongs to the first terminal group. In this case, the first network element determines the first information. If the first service description information identifies the service A, and the second service description information identifies a service B, the first network element determines, based on that the service accessed by the terminal device (UE 1) is different from the service of the first terminal group, that the UE 1 does not belong to the first terminal group.

The determining the first information may be understood as: if there is no first information for the first terminal group currently, selecting, by the first network element, one piece of first information: or if the first information for the first terminal group already exists currently, using, by the first network element, the existing first information.

Optionally, before S510, the method may further include S503 and S504. S503: The third network element sends first area location information to the second network element, and correspondingly, the second network element receives the first area location information. S504: The second network element sends the first area location information to the first network element, and correspondingly, the first network element receives the first area location information.

It should be noted that S503 and S504 are similar to S403 and S404. For brevity, details are not described again.

Optionally, the method may further include S530 to S570. S530: The first network element sends the second service description information to the second network element, and correspondingly, the second network element receives the second service description information from the first network element.

S540: The second network element obtains a correspondence of the second service description information from a fourth network element, where the fourth network element may be a UDR.

S550: The second network element determines, based on the correspondence, information corresponding to the second service description information.

S560: The second network element sends the information corresponding to the second service description information to the first network element, and correspondingly, the first network element receives the information corresponding to the second service description information from the second network element.

S570: The first network element determines whether the information corresponding to the received second service description information is different from the selected second information.

It should be understood that S530 to S570 are similar to S430 to S470. For brevity, details are not described again.

It should be noted that, in this application, the first terminal group described above is a user group including at least one terminal device that accesses a same (specific) service and uses a same EAS. To be specific, the 5GC groups the at least one terminal device into the first terminal group based on a same service requirement of the at least one terminal device, and selects a same application server (EAS) for the first terminal group.

It should be further noted that the first terminal group described above may also refer to at least one terminal device that accesses a same (specific) service. In this case, the first terminal group is not a concept of a real group, but at least one terminal device that accesses a same (specific) service.

It should be understood that the first terminal group may also be referred to as a first user group, a terminal group, a user group, a dynamic UE group, or the like. This is not limited in this embodiment of this application. For ease of description of this embodiment of this application, in the following embodiments, a dynamic UE group is uniformly used to represent the first user group. Information related to the dynamic UE group may be referred to as dynamic UE group information, dynamic group-related information, dynamic UE group-related information, subscriber group-related information, or the like. It should be understood that this is not limited in this embodiment of this application.

Specifically, the information related to the dynamic UE group may be information used to determine members of the dynamic UE group, or may be parameter configuration information of the dynamic UE group, or the like. It may be considered that the first service description information, the second service description information, the first area location information, and the identification information are all included in the dynamic UE group information.

With reference to a plurality of accompanying drawings, the following describes in detail a method for determining an application server provided in embodiments of this application. For ease of understanding embodiments of this application, in the following embodiments, a specific technical solution of this application is described in detail by using a dynamic UE group and dynamic UE group information.

Figure 6A:
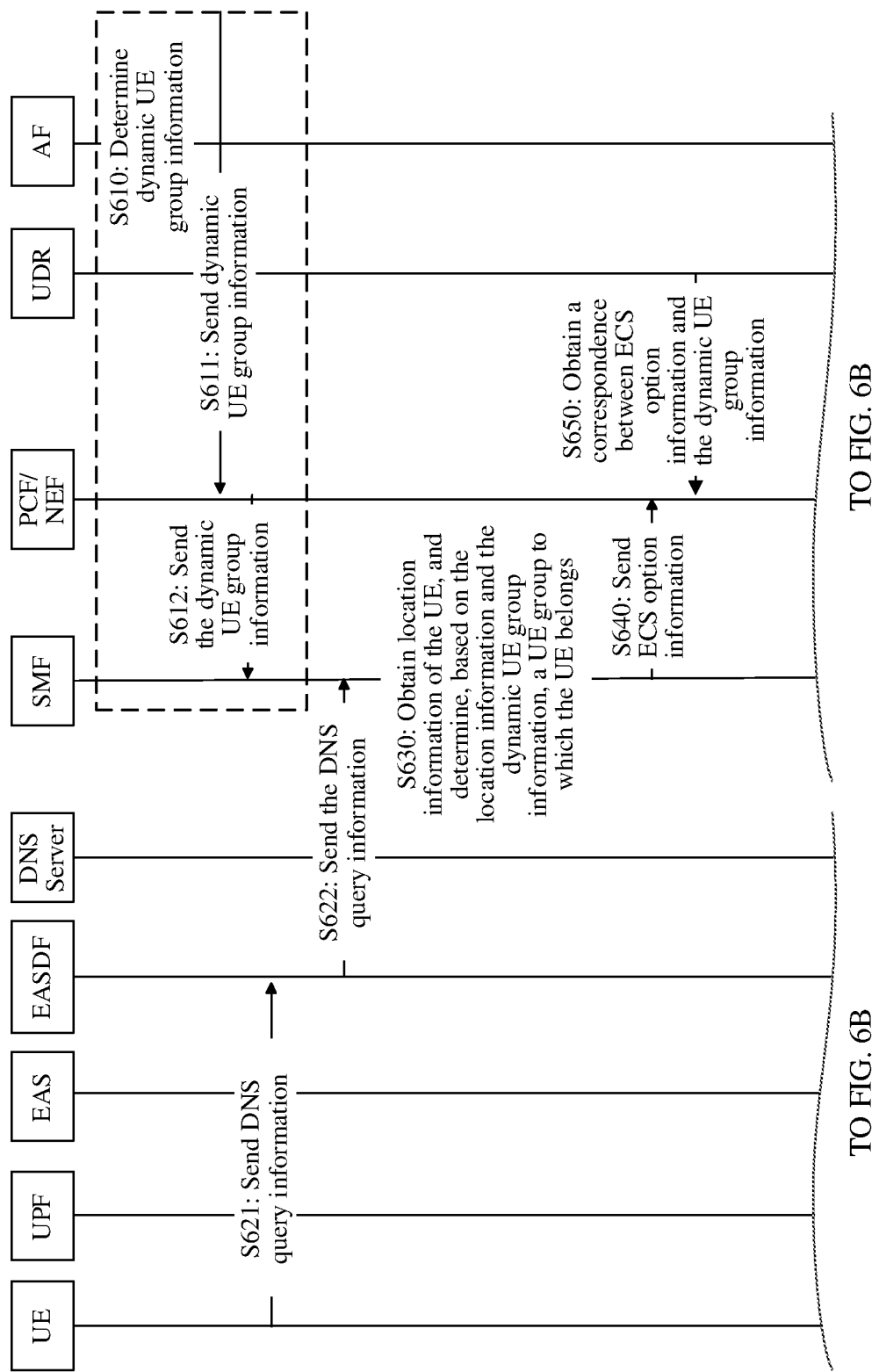
FIG. 6A and FIG. 6B are a schematic flowchart of a method for determining an application server according to another embodiment of this application.
Figure 6B:
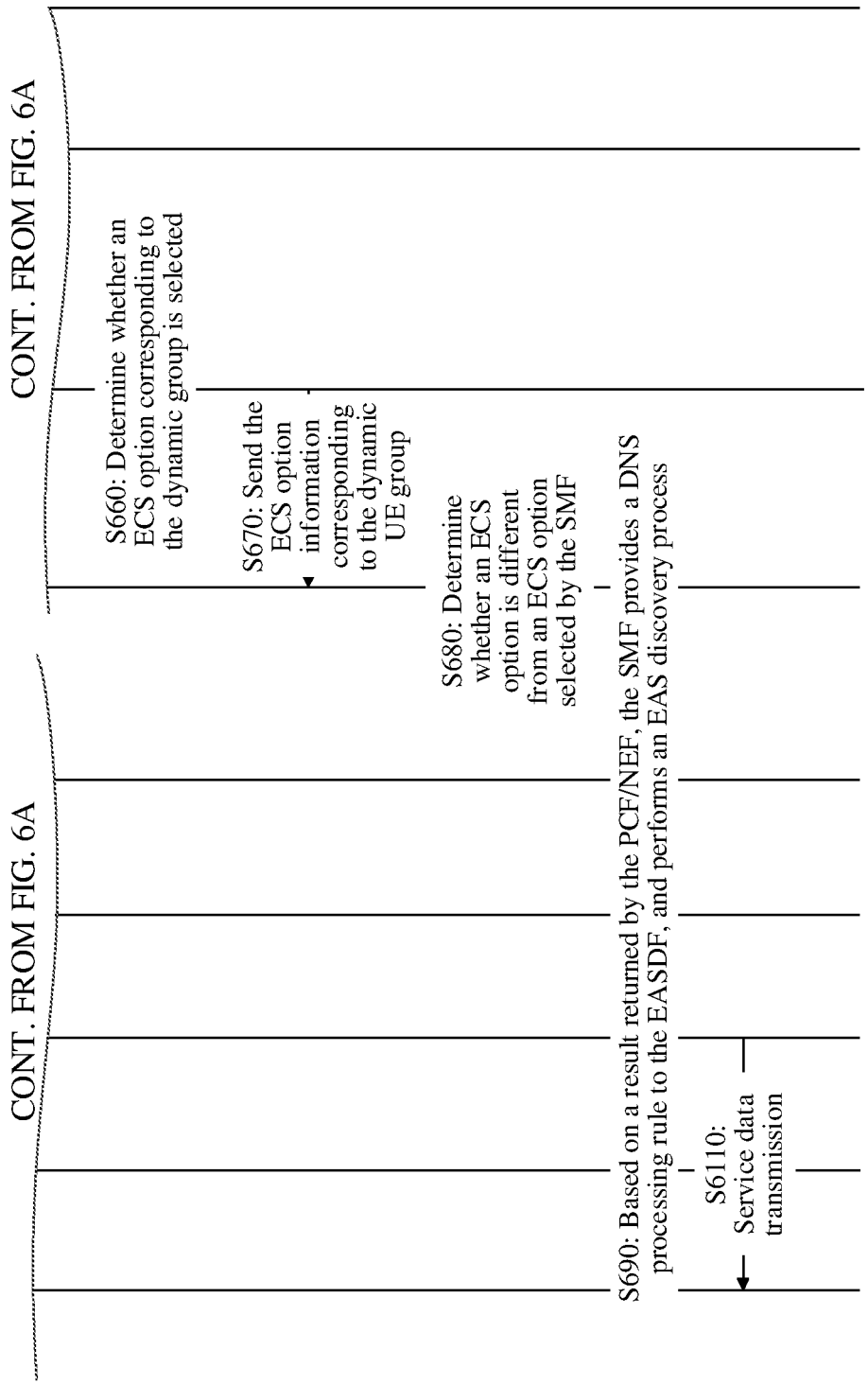

FIG. 6A and FIG. 6B are a schematic flowchart of a method for determining an application server according to an embodiment of this application. The method may include at least the following steps.

S610: An AF determines dynamic UE group information in a manner. Specifically, the AF may determine a plurality of terminal devices as one dynamic UE group based on that service requirements of the plurality of terminal devices are the same, that is, the plurality of terminal devices all access a same service, and determine related information of the dynamic UE group or a member of the dynamic UE group as the dynamic UE group information.

S611: The AF sends the dynamic UE group information to a PCF/NEF, and correspondingly, the PCF/NEF receives the dynamic UE group information.

S612: The PCF/NEF forwards the dynamic UE group information to an SMF, and correspondingly, the SMF receives the dynamic UE group information forwarded by the PCF/NEF.

Specifically, the dynamic UE group information may include service description information, area location information, and indication information (a function of the indication information is similar to that of the second information described above) corresponding to the dynamic UE group. The service description information may be FQDN information or application identifier information (Application Identifier), and the area location information may be geographical area information (location area). That is, the dynamic UE group information may include the geographic area information (location area) and the FQDN information that correspond to the dynamic UE group, or may include the geographic area information (location area) and the application identifier information (application identifier) that correspond to the dynamic UE group. It should be understood that this is not limited in this embodiment of this application.

S621: UE sends DNS query information to an EASDF, and correspondingly, the EASDF receives the DNS query information.

S622: The EASDF forwards the DNS query information to the SMF, where the DNS query information includes service description information corresponding to the UE.

S630: The SMF obtains location information of the UE and the dynamic UE group information, and the SMF determines a dynamic UE group to which the UE belongs, and determines first information for the dynamic UE group. In this case, the first information may be an ECS option.

Specifically, in a possible implementation, the dynamic UE group information includes service description information corresponding to the dynamic UE group. In this case, the SMF may determine, based on the service description information in the dynamic UE group information, a service accessed by the dynamic UE group, determine, based on the service description information of the UE, a service accessed by the UE, and determine, based on whether the service accessed by the dynamic UE group is the same as the service accessed by the UE, the dynamic UE group to which the UE belongs.

Alternatively, in a possible implementation, the dynamic UE group information includes geographical area information corresponding to the dynamic UE group. In this case, the SMF may determine a geographical location of the dynamic UE group based on the geographical area information in the dynamic UE group information, and the SMF obtains location information of the UE, determines a geographical area location of the UE based on the location information of the UE, and determines, based on whether the geographic area location of the UE is located in the geographic area location of the dynamic UE group, the dynamic UE group to which the UE belongs.

It may be understood that, when there is only one SMF in a scenario, if the SMF determines that there is no ECS option for the dynamic UE group currently, then in this case, the SMF determines an ECS option for the dynamic UE group. If the SMF determines that there is an ECS option for the user group currently, then in this case, the SMF uses the existing ECS option.

When there are a plurality of SMFs in a scenario, for example, there is an SMF 1, an SMF 2, and an SMF 3 in the current scenario, if the SMF 1 determines that there is no ECS option for the dynamic UE group currently, then in this case, the SMF 1 determines an ECS option for the dynamic UE group, and sends the selected ECS option to other SMFs (the SMF 2 and the SMF 3).

Optionally, the method may further include S640 to S680.
S640: The SMF sends the dynamic UE group information and ECS option information to the PCF/NEF.
  S650: The PCF/NEF obtains a correspondence between the dynamic UE group information and the ECS option information from a UDR.
  S660: The PCF/NEF determines whether an ECS option corresponding to the dynamic group is selected.
  S670: The PCF/NEF sends ECS option information corresponding to the dynamic group to the SMF.
  S680: The SMF determines whether the received ECS option information is different from the ECS option information originally determined by the SMF, and if the received ECS option information is different from the ECS option information originally determined by the SMF, the SMF replaces an originally determined ECS option with a received ECS option.

Specifically, in a possible implementation, if the PCF/NEF determines, based on the correspondence between the dynamic UE group information and the ECS option information, that the dynamic UE group information corresponds to an ECS option 1, in this case, the PCF/NEF returns the determined ECS option 1 to the SMF. After receiving the ECS option 1, the SMF determines that the ECS option 1 is the same as a previously selected ECS option 1, and determines to determine the ECS option 1 for the dynamic UE group, that is, determines to determine the ECS option 1 for UE that belongs to the dynamic UE group.

In a possible implementation, if the PCF/NEF determines, based on the correspondence between the dynamic UE group information and the ECS option information, that the dynamic UE group information corresponds to an ECS option 2, in this case, the PCF/NEF returns the determined ECS option 2 to the SMF. After receiving the ECS option 2, the SMF determines that the ECS option 2 is different from the previously determined ECS option 1. In this case, the SMF determines to re-determine an ECS option 2 for the dynamic UE group, to replace the previously determined ECS option 1, that is, determines to re-determine the ECS option 2 for the UE that belongs to the dynamic UE group.

It should be noted that, when there are the plurality of SMFs in the scenario, if the SMF 1 determines to re-determine an ECS option 2 for the dynamic UE group, to replace the previously determined ECS option 1, the SMF 1 initiates an information update to another SMF, so that the another SMF also re-determines an ECS option 2 for the dynamic UE group.

In another possible implementation, if the PCF/NEF determines that the ECS option information corresponding to the dynamic UE group is not selected, then in this case, the PCF/NEF records ECS option information (for example, an ECS option 1) provided by the SMF, and returns the ECS option information to the SMF for confirmation. When there are the plurality of SMFs in the scenario, ECS option information (ECS option 1) needs to be sent to another SMF, so that the another SMF performs an information update.

It should be understood that the foregoing correspondence may be one-to-one, one-to-many, or many-to-one. This is not limited in this embodiment of this application.

It should be further understood that the correspondence may be obtained from the UDR, that is, the UDR maintains the correspondence between the dynamic UE group information and the ECS option information. Alternatively, the correspondence may be obtained from the SMF, or may be obtained from the AF. It may be understood that the SMF/AF maintains the correspondence between the dynamic UE group information and ECS option information. This is not limited in this embodiment of this application.

It may be understood that in a case that the UE belongs to the dynamic UE group, that the SMF determines the ECS option information for the dynamic UE group is equivalent to that the SMF determines the ECS option information for the UE.
  S690: The SMF provides a DNS message processing rule for the EASDF, where the DNS processing rule includes the ECS option information corresponding to the dynamic UE group, and performs a subsequent EAS discovery process. A specific service discovery mechanism procedure is described above, and details are not described herein again.
  S6110: The UE completes discovery of an application server (EAS), and normal service transmission is performed between the UE and the EAS.

Figure 7:
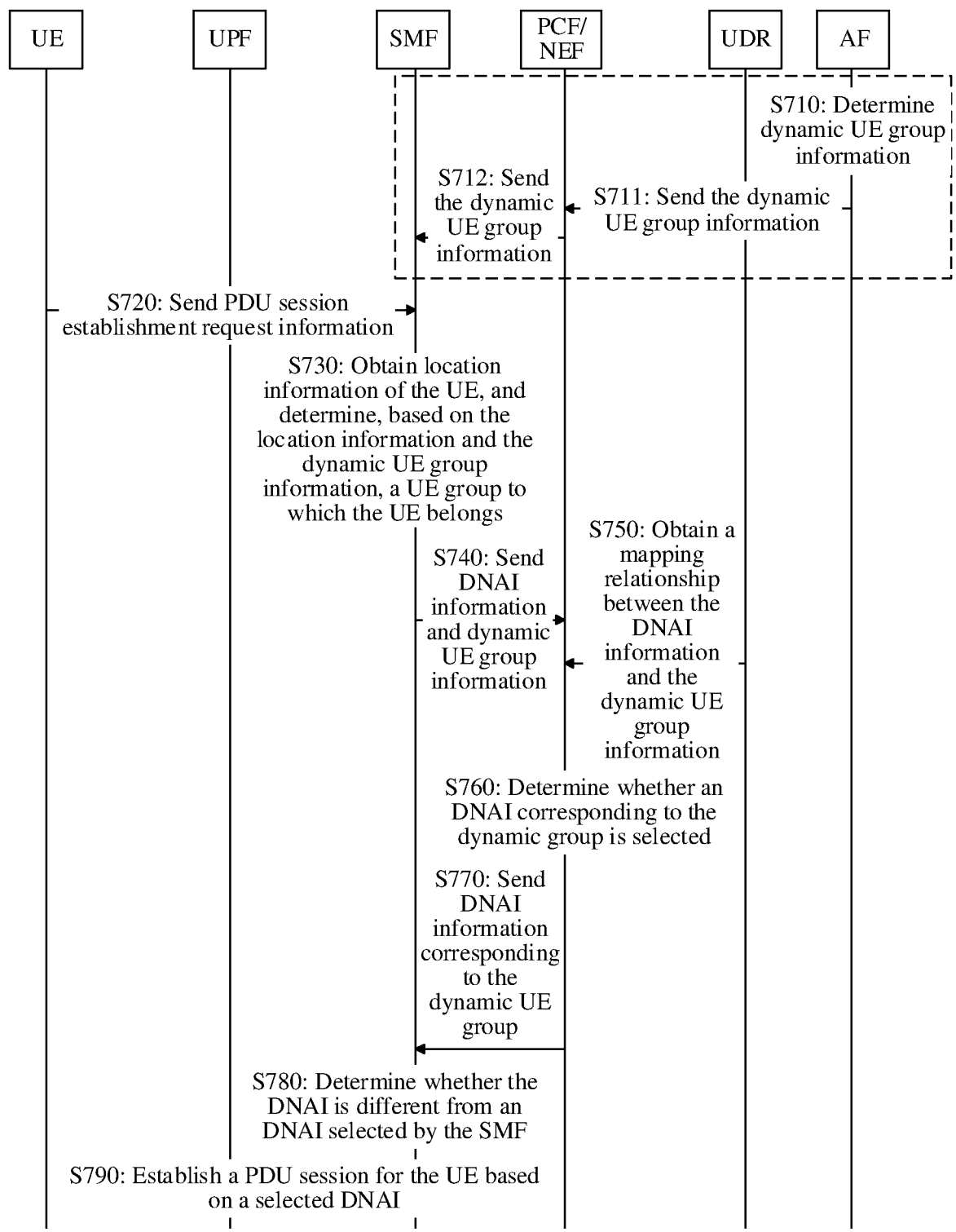
FIG. 7 is a schematic flowchart of a method for determining an application server according to another embodiment of this application.

FIG. 7 is a schematic flowchart of a method for determining an application server according to another embodiment of this application. The method may include at least the following steps.
  S710: An AF determines dynamic UE group information in a manner. Specifically, the
  AF determines a dynamic UE group and information about the dynamic UE group based on service requirements of a plurality of terminal devices. Similar to S610, for brevity, details are not described in this application again.
    S711: The AF sends the dynamic UE group information to a PCF/NEF, and correspondingly, the PCF/NEF receives the dynamic UE group information.
    S712: The PCF/NEF forwards the dynamic UE group information to an SMF, and correspondingly, the SMF receives the dynamic UE group information forwarded by the PCF/NEF.

Specifically, the dynamic UE group information may include service description information, area location information, and indication information (a function is similar to that of the second information described above) corresponding to the dynamic UE group. The service description information may be DNN information or S-NSSAI information, and the area location information may be geographical area information (location area). In other words, the dynamic UE group information may include the geographic area information (location area) and the DNN information that correspond to the dynamic UE group, or may include the geographic area information (location area) and the S-NSSAI information that correspond to the dynamic UE group. It should be understood that this is not limited in this embodiment of this application.
    S720: The UE sends PDU session establishment request information to the SMF, where a PDU session establishment process includes establishing a session of a user plane path between the UE and a UPF. It should be noted that a specific PDU session establishment procedure is in a conventional technology, and details are not described herein again.

S730: The SMF obtains location information of the UE and the dynamic UE group information, and the SMF determines a dynamic UE group to which the UE belongs, and determines first information for the dynamic UE group. In this case, the first information is a DNAI.

Specifically, in a possible implementation, the dynamic UE group information includes service description information corresponding to the dynamic UE group. In this case, the SMF may determine, based on the service description information in the dynamic UE group information, a service accessed by the dynamic UE group, determine, based on the service description information of the UE, a service accessed by the UE, and determine, based on whether the service accessed by the dynamic UE group is the same as the service accessed by the UE, the dynamic UE group to which the UE belongs.

Alternatively, in a possible implementation, the dynamic UE group information includes geographical area information corresponding to the dynamic UE group. In this case, the SMF may determine a geographical location of the dynamic UE group based on the geographical area information in the dynamic UE group information, and the SMF obtains the location information of the UE, determines a geographical area location of the UE based on the location information of the UE, and determines, based on whether the geographic area location of the UE is located in the geographic area location of the dynamic UE group, the dynamic UE group to which the UE belongs.

It may be understood that, when there is only one SMF in a scenario, if the SMF determines that there is no DNAI for the dynamic UE group currently, then in this case, the SMF determines a DNAI option for the dynamic UE group. If the SMF determines that there is a DNAI for the user group currently, then in this case, the SMF uses the existing DNAI.

When there are a plurality of SMFs in a scenario, for example, there is an SMF 1, an SMF 2, and an SMF 3 in the current scenario, if the SMF 1 determines that there is no DNAI for the dynamic UE group currently, then in this case, the SMF 1 determines a DNAI for the dynamic UE group, and sends the selected DNAI to other SMFs (the SMF 2 and the SMF 3).

Optionally, the method may further include S740 to S780.

S740: The SMF sends the dynamic UE group information and DNAI information to the PCF/NEF.

S750: The PCF/NEF obtains a correspondence between the dynamic UE group information and the DNAI information from a UDR.

S760: The PCF/NEF determines whether a DNAI corresponding to the dynamic group is selected.

S770: The PCF/NEF sends DNAI information corresponding to the dynamic group to the SMF.

S780: The SMF determines whether the received DNAI information is different from the DNAI originally determined by the SMF, and if the received DNAI information is different from the DNAI originally determined by the SMF, the SMF replaces the originally DNAI determined by the SMF with a received DNAI.

Specifically, in a possible implementation, if the PCF/NEF determines, based on the correspondence between the dynamic UE group information and the DNAI information, that the dynamic UE group information corresponds to a DNAI 1, in this case, the PCF/NEF returns the determined DNAI 1 to the SMF. After receiving the DNAI 1, the SMF determines that the DNAI 1 is the same as a previously selected DNAI 1, and determines to determine the DNAI 1 for the dynamic UE group, that is, determines to determine the DNAI 1 for UE that belongs to the dynamic UE group.

In a possible implementation, if the PCF/NEF determines, based on the correspondence between the dynamic UE group information and the DNAI information, that the dynamic UE group information corresponds to a DNAI 2, in this case, the PCF/NEF returns the determined DNAI 2 to the SMF. After receiving the DNAI 2, the SMF determines that the DNAI 2 is different from the previously determined DNAI 1. In this case, the SMF determines to re-determine a DNAI 2 for the dynamic UE group, to replace the previously determined DNAI 1, that is, determines to re-determine the DNAI 2 for the UE that belongs to the dynamic UE group.

It should be noted that, when there are the plurality of SMFs in the scenario, if an SMF 1 determines to re-determine a DNAI 2 for the dynamic UE group, to replace the previously determined DNAI 1, the SMF 1 initiates an information update to another SMF, so that the another SMF also re-determines a DNAI 2 for the dynamic UE group.

In another possible implementation, if the PCF/NEF determines that the DNAI information corresponding to the dynamic UE group is not selected, the PCF/NEF records DNAI information (for example, the DNAI 1) provided by the SMF, and returns the DNAI information to the SMF for confirmation. When there are the plurality of SMFs in the scenario, DNAI information (DNAI 1) needs to be sent to another SMF, so that the another SMF performs an information update.

It should be understood that the foregoing correspondence may be one-to-one, one-to-many, or many-to-one. This is not limited in this embodiment of this application.

It should be further understood that the correspondence may be obtained from the UDR, that is, the UDR maintains the correspondence between the dynamic UE group information and the DNAI information. Alternatively, the correspondence may be obtained from the SMF, or may be obtained from the AF. It may be understood that the SMF/AF maintains the correspondence between the dynamic UE group information and a DNAI. This is not limited in this embodiment of this application.

It may be understood that in a case that the UE belongs to the dynamic UE group, that the SMF determines the DNAI information for the dynamic UE group is equivalent to that the SMF determines the DNAI information for the UE.

S790: The SMF establishes a PDU session for the UE based on the selected DNAI information, for performing subsequent service transmission. A specific procedure is in a conventional technology, and details are not described herein again.

Figure 8A:
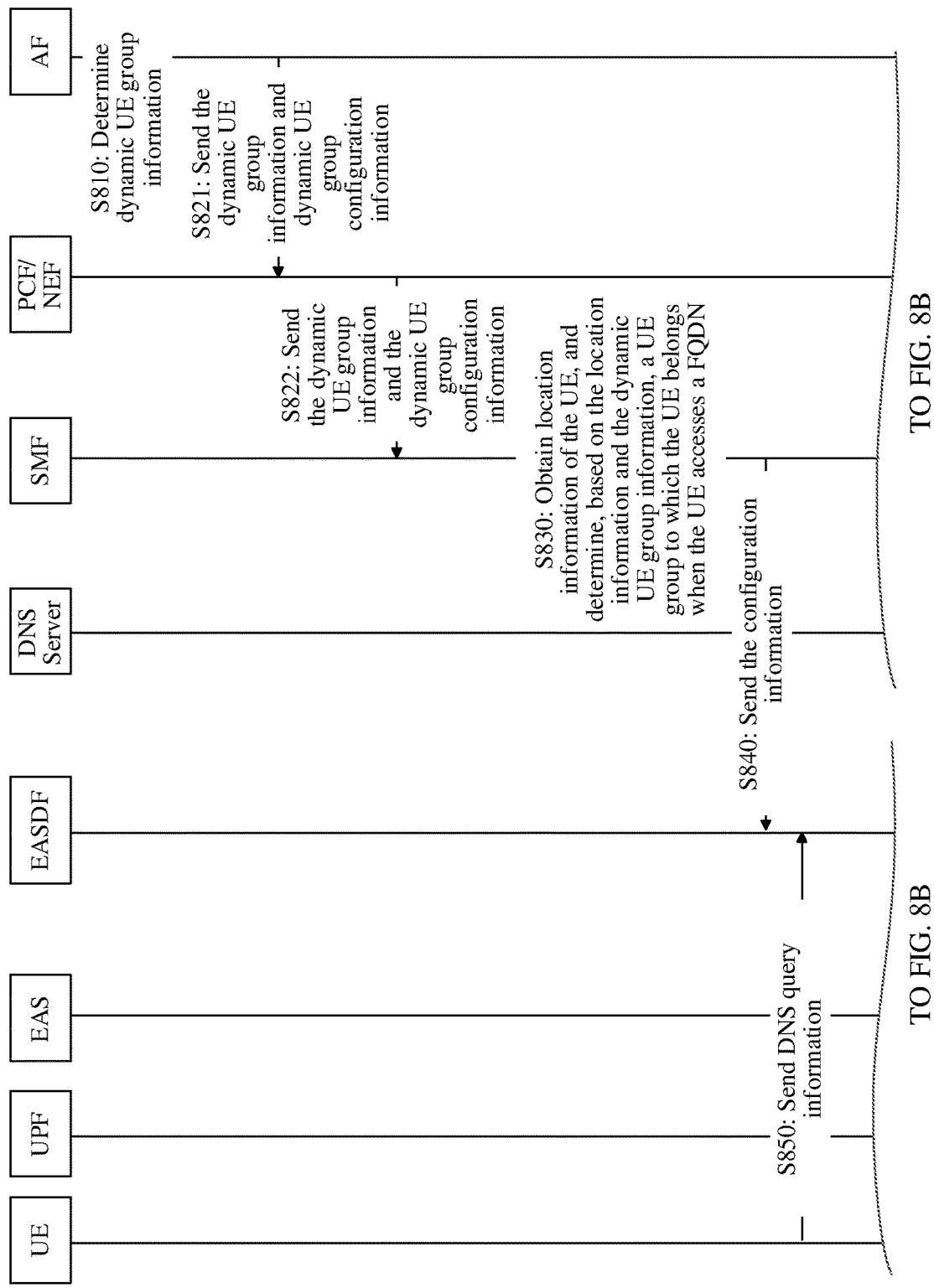
FIG. 8A and FIG. 8B are a schematic flowchart of a method for determining an application server according to another embodiment of this application.
Figure 8B:
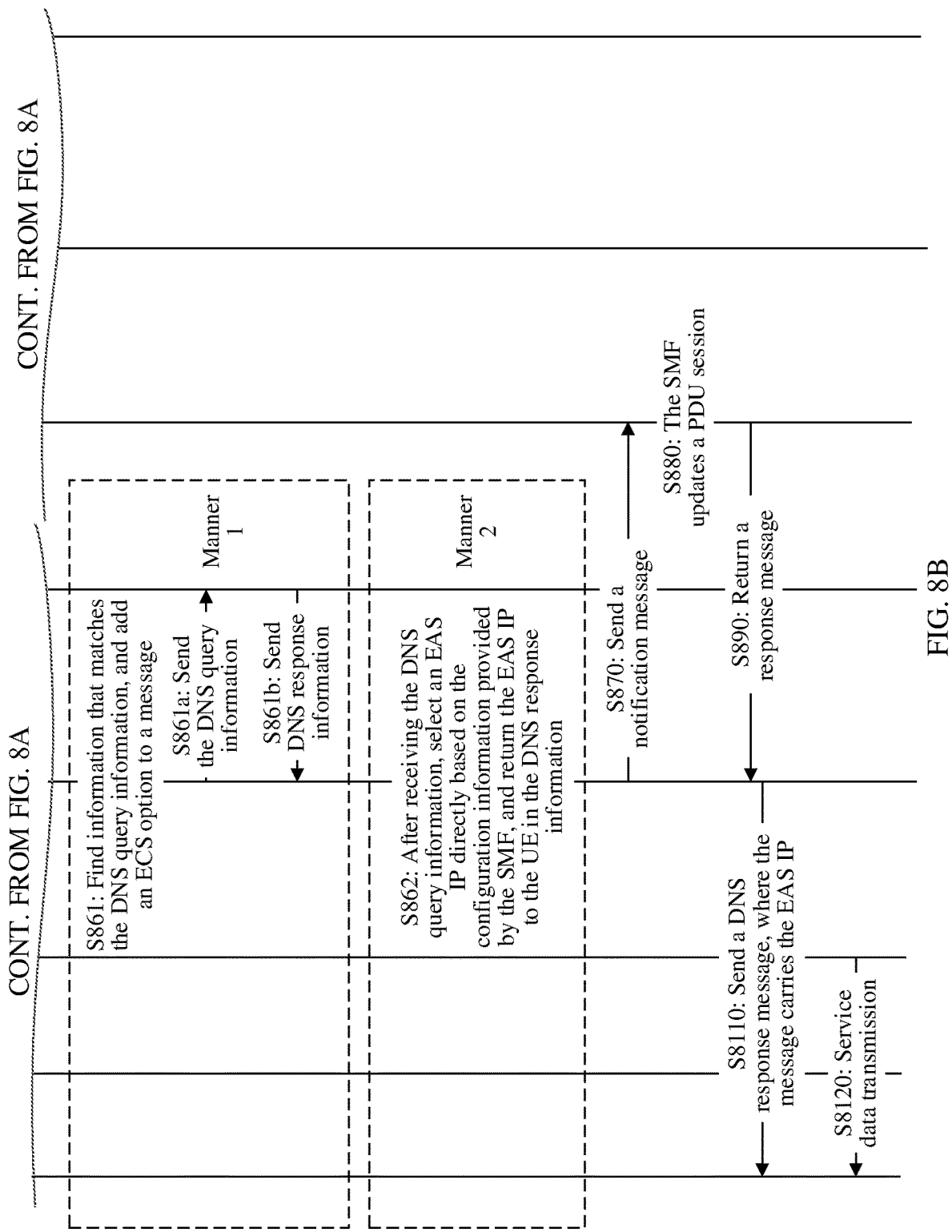

FIG. 8A and FIG. 8B are a schematic flowchart of a method for determining an application server according to another embodiment of this application. The method may include at least the following steps.

S810: An AF determines dynamic UE group information in a manner. Specifically, the AF determines a dynamic UE group and information about the dynamic UE group based on service requirements of a plurality of terminal devices. Similar to S610, for brevity, details are not described in this application again.

S821: The AF sends the dynamic UE group information and dynamic UE group configuration information to a PCF/NEF, and correspondingly, the PCF/NEF receives the dynamic UE group information and the dynamic UE group configuration information.

S822: The PCF/NEF forwards the dynamic UE group information and the dynamic UE group configuration information to an SMF, and correspondingly, the SMF receives the dynamic UE group information forwarded by the PCF/NEF.

The dynamic UE group information may include service description information, area location information, and indication information (a function is similar to that of the second information described above) corresponding to the dynamic UE group. The service description information may be FQDN information or application identifier information (application identifier), and the area location information may be geographical area information (location area).

That is, the dynamic UE group information may include the geographic area information (location area) and the FQDN information that correspond to the dynamic UE group, or may include the geographic area information (location area) and the application identifier information (application identifier) that correspond to the dynamic UE group. It should be understood that this is not limited in this embodiment of this application.

The dynamic UE group configuration information may include information that needs to be shared by members of the dynamic UE group, for example, ECS option information, EAS IP information, and DNAI information. It should be understood that this is not limited in this embodiment of this application.

Optionally, in a possible implementation, the AF may first send the dynamic UE group information and the dynamic UE group configuration information to the NEF/PCF, and then the NEF/PCF forwards the dynamic UE group information and the dynamic UE group configuration information to the SMF. It should be understood that a manner of sending the dynamic UE group information and the dynamic UE group configuration information is not limited herein in this embodiment of this application.

S830: The SMF obtains location information of UE and the dynamic UE group information, and the SMF determines a dynamic UE group to which the UE belongs.

Specifically, in a possible implementation, the dynamic UE group information includes service description information corresponding to the dynamic UE group. In this case, the SMF may determine, based on the service description information in the dynamic UE group information, a service accessed by the dynamic UE group, determine, based on the service description information of the UE, a service accessed by the UE, and determine, based on whether the service accessed by the dynamic UE group is the same as the service accessed by the UE, the dynamic UE group to which the UE belongs.

Alternatively, in a possible implementation, the dynamic UE group information includes geographical area information corresponding to the dynamic UE group. In this case, the SMF may determine a geographical location of the dynamic UE group based on the geographical area information in the dynamic UE group information, and the SMF obtains location information of the UE, determines a geographical area location of the UE based on the location information of the UE, and determines, based on whether the geographic area location of the UE is located in the geographic area location of the dynamic UE group, the dynamic UE group to which the UE belongs.

S840: The SMF sends the dynamic UE group configuration information corresponding to the dynamic UE group to an EASDF, and correspondingly, the EASDF receives the dynamic UE group configuration information.

S850: When accessing a service, the UE sends DNS query information (DNS query) to the EASDF.

S870: The EASDF receives a DNS query message that is sent by a terminal device in the dynamic UE group when the terminal device accesses a specific service.

Manner 1: For example, the dynamic UE group configuration information is an ECS option. The EASDF finds ECS option information that matches the DNS query information, adds the ECS option to the DNS query message, and then obtains, according to an existing DNS query procedure, address information (EAS IP) of an application server accessed by the dynamic UE group.

Manner 2: For example, the dynamic UE group configuration information is an EAS IP address. After receiving the DNS query message, the EASDF directly generates a DNS response message based on the EAS IP address included in the dynamic UE group configuration information provided by the SMF, to return EAS IP address information to the UE in the dynamic UE group.

S870: The EASDF sends a notification message to the SMF.

S880: The SMF selects a local PSA based on an ECS range, and updates a PDU session. Specifically, based on EAS information (for example, an EAS IP address) received from the EASDF, the SMF may determine a DNAI and associated N6 traffic routing information of the DNAI. The SMF may perform selection and insertion of the UL CL/BP and a local PSA to complete establishment of a data plane path for the UE.

S890: The SMF responds to the notification message in S870. DNS response information (DNS response) carries the EAS information (for example, the EAS IP address).

S8110: The EASDF returns the DNS response information to the UE, where the DNS response information carries the EAS information (for example, the EAS IP address).

S8120: The terminal device completes edge server (EAS) selection, and performs normal service transmission with the EAS.

Based on the foregoing technical solution, a same EAS server can be selected for terminal devices that access a specific (same) service and that are located in an area location.

Embodiments described in this specification may be independent solutions, or may be combined based on internal logic. All these solutions fall within the protection scope of this application.

It may be understood that, in the foregoing method embodiments, methods and operations implemented by each device may also be implemented by a component (for example, a chip or a circuit) of a corresponding device.

The foregoing mainly describes the solutions provided in embodiments of this application from a perspective of interaction. It may be understood that, to implement the foregoing functions, each network element, for example, a transmitting end device or a receiving end device, includes a corresponding hardware structure and/or software module for performing each function. A person skilled in the art should be aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, functional modules of the transmitting end device or the receiving end device may be obtained through division based on the foregoing method examples. For example, each functional module may be obtained through division based on each function, or two or more functions may be integrated into one processing module. The foregoing integrated module may be implemented in a form of hardware, or may be implemented in a form of a software functional module. It should be noted that, in embodiments of this application, module division is an example, and is merely a logical function division. In actual implementation, another division manner may be used. The following uses an example in which functional modules are obtained through division corresponding to each function as an example for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The foregoing describes in detail the method provided in embodiments of this application with reference FIG. 4 to FIG. 8B. The following describes, in detail with reference to FIG. 9 to FIG. 11, apparatuses provided in embodiments of this application. It should be understood that descriptions of apparatus embodiments correspond to the descriptions of the method embodiments. Therefore, for content that is not described in detail, refer to the foregoing method embodiments. For brevity, details are not described herein again.

Figure 9:
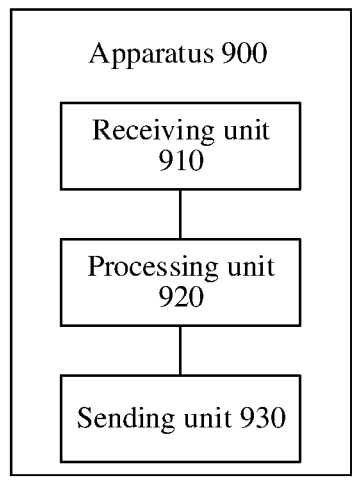
FIG. 9 is a schematic block diagram of an apparatus for determining an application server 900 according to this application.

FIG. 9 is a schematic block diagram of an apparatus 900 of a first network element according to an embodiment of this application. It should be understood that the apparatus 900 includes a receiving unit 910, a processing unit 920, and a sending unit 930.

The receiving unit 910 is configured to receive first request information, where the first request information includes first service description information, the first service description information identifies a service accessed by a terminal device, and the first request information is for requesting to determine first information for the terminal device; and the processing unit 920 is configured to determine the first information in a case that the terminal device belongs to a first terminal group, where the first information is for determining a first application server for a terminal device in the first terminal group.

In a possible implementation, the receiving unit 910 is further configured to receive second information and second service description information, where the second information indicates to determine the first application server for the first terminal group, and the second service description information identifies a service accessed by the first terminal group; and the processing unit 920 is specifically configured to determine that the service accessed by the terminal device is the same as the service accessed by the first terminal group.

In another possible implementation, the first service description information or the second service description information includes at least one of the following: a fully qualified domain name (FQDN) and application identifier information.

In another possible implementation, the receiving unit 910 is further configured to receive first area location information, where the first terminal group is located in a first area location indicated by the first area location information; and the processing unit 920 is specifically configured to determine that the terminal device is located in the first area location indicated by the first area location information.

In another possible implementation, the apparatus further includes: a sending unit 930, configured to send the second service description information to a second network element; and the processing unit 920 is specifically configured to receive the first information from the second network element.

In another possible implementation, the sending unit 930 is further configured to send the second service description information to a second network element; and the receiving unit 910 is configured to receive third information from the second network element, where the third information is for determining a second application server for the first terminal group.

In another possible implementation, the sending unit 930 is further configured to send the first information to the second network element.

In another possible implementation, the first information includes at least one of the following: a first client subnet option (ECS option), a first data network access identifier (DNAI), and a first application server address (EAS IP).

In another possible implementation, the third information includes at least one of the following: a second client subnet option (ECS option), a second data network access identifier (DNAI), and a second application server address (EAS IP).

In another possible implementation, the sending unit 930 is further configured to send the first area location information to the second network element, where the first terminal group is located in the first area location indicated by the first area location information.

In another possible implementation, the sending unit 930 is further configured to send identification information to the second network element, where the identification information identifies the first terminal group.

In another possible implementation, the receiving unit 910 is further configured to receive fourth information, where the fourth information includes at least one of the following: the first client subnet option (ECS option), the first data network access identifier (DNAI), and the first application server address (EAS IP); and the sending unit 930 is further configured to send the fourth information to a fifth network element.

Figure 10:
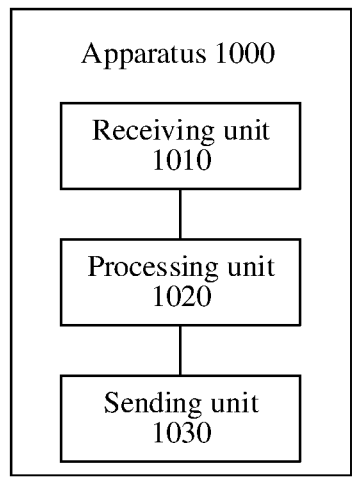
FIG. 10 is a schematic block diagram of an apparatus for determining an application server 1000 according to this application.

FIG. 10 is a schematic block diagram of an apparatus 1000 of a second network element according to an embodiment of this application. It should be understood that the apparatus 1000 includes a receiving unit 1010, a processing unit 1020, and a sending unit 1030.

The receiving unit 1010 is configured to receive second service description information sent by a first network element, where the second service description information identifies a service accessed by a first terminal group. The processing unit 1020 is configured to determine first information based on a correspondence between the second service description information and the first information. The sending unit 1030 is configured to send the first information to the first network element, where the first information is for determining a first application server for the first terminal group.

In a possible implementation, the receiving unit 1010 is further configured to receive the first information sent by the first network element.

In another possible implementation, the processing unit 1020 is further configured to obtain the correspondence between the second service description information and the first information from a fourth network element.

In another possible implementation, the first information includes at least one of the following: a first client subnet option (ECS option), a first data network access identifier (DNAI), and a first application server address (EAS IP).

In another possible implementation, the receiving unit 1010 is further configured to receive first area location information sent by the first network element, where the first terminal group is located in a first area location indicated by the first area location information. In another possible implementation, the receiving unit 1010 is further configured to receive identification information sent by the first network element, where the identification information identifies the first terminal group.

In another possible implementation, the second service description information includes at least one of the following: a fully qualified domain name (FQDN), a data network name DNN, application identifier information, and single network slice selection assistance information S-NSSAI.

Figure 11:
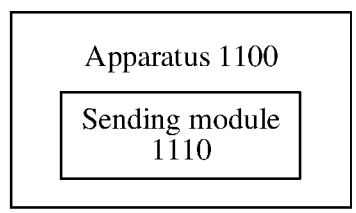
FIG. 11 is a schematic block diagram of an apparatus for determining an application server 1100 according to this application.

FIG. 11 is a schematic block diagram of an apparatus 1100 of a third network element according to an embodiment of this application. It should be understood that the apparatus 900 includes a sending unit 1110.

The sending unit 1110 is configured to send second information and second service description information, where the second service description information identifies a service accessed by a first terminal group, and the second information indicates to determine a first application server for the first terminal group.

In a possible implementation, the second service description information includes at least one of the following: a fully qualified domain name (FQDN), a data network name (DNN), application identifier information, and single network slice selection assistance information (S-NSSAI).

In another possible implementation, the sending unit is further configured to send fourth information, where the fourth information includes at least one of the following: a first client subnet option (ECS option), a first data network access identifier (DNAI), and a first application server address (EAS IP).

It should be understood that the division of the modules in the communication apparatus is merely logical function division. During actual implementation, all or some of the modules may be integrated into one physical entity, or may be physically separated. In addition, all modules in the communication apparatus may be implemented in a form of software invoked by a processing element, or may be implemented in a form of hardware: or some modules may be implemented in a form of software invoked by a processing element, and some modules are implemented in a form of hardware. For example, each module may be a separately disposed processing element, or may be integrated into a chip of the communication apparatus for implementation. In addition, each module may be stored in a memory in a form of a program, and a processing element of the communication apparatus invokes and performs a function of the module. In addition, all or some of these modules may be integrated together or implemented independently. The processing element herein may also be referred to as a processor, and may be an integrated circuit having a signal processing capability. During implementation, steps in the foregoing methods or the foregoing modules may be implemented by using a hardware integrated logic circuit in a processor element, or may be implemented in the form of software invoked by the processing element.

In an example, a module in any one of the foregoing communication apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these forms of integrated circuits. For another example, when the modules in the communication apparatus may be implemented in a form of scheduling a program by a processing element, the processing element may be a general-purpose processor, for example, a central processing unit (CPU) or another processor that can invoke the program. For another example, these modules may be integrated together and implemented in a form of a system-on-chip (SOC).

Figure 12:
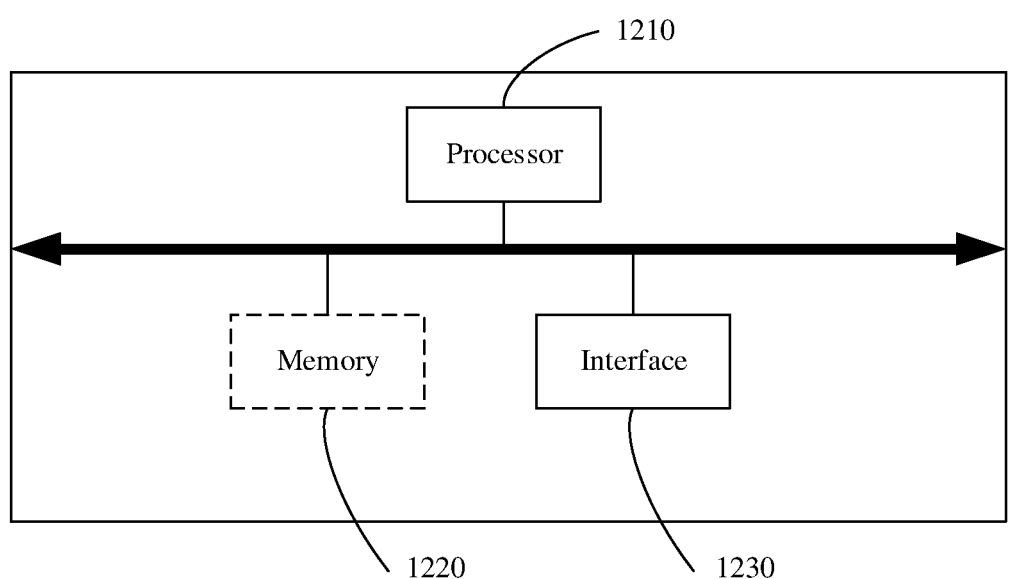
FIG. 12 is a schematic diagram of a structure of an apparatus according to an embodiment of this application.

FIG. 12 is a schematic diagram of a communication apparatus according to an embodiment of this application. The communication apparatus is configured to implement operations of the first network element, the second network element, and the third network element in the foregoing embodiments. As shown in FIG. 12, the communication apparatus includes a processor 1210 and an interface 1230. The processor 1210 is coupled to the interface 1230. The interface 1230 is configured to implement communication with another device. The interface 1230 may be a transceiver or an input/output interface. The interface 1230 may be, for example, an interface circuit. Optionally, the communication apparatus further includes a memory 1220, configured to store instructions executed by the processor 1210, or store input data required by the processor 1210 to run the instructions, or store data generated after the processor 1210 runs the instructions.

The method performed by the first network element, the second network element, and the third network element in the foregoing embodiments may be implemented by the processor 1210 by invoking a program stored in a memory (which may be a memory 1220 in the first network element, the second network element, or the third network element, or may be an external memory). That is, the first network element, the second network element, and the third network element may include the processor 1210. The processor 1210 invokes the program in the memory to perform the method performed by the first network element, the second network element, and the third network element in the foregoing method embodiments. The processor herein may be an integrated circuit, for example, a CPU, that has a signal processing capability. The first network element, the second network element, and the third network element may be implemented by configuring one or more integrated circuits for implementing the foregoing method, for example, one or more ASICs, one or more microprocessors DSPs, one or more FPGAs, or a combination of at least two of these integrated circuit forms. Alternatively, the foregoing implementations may be combined.

Specifically, a function/implementation process of the units in FIG. 9 to FIG. 11 may be implemented by the processor 1210 in the communication apparatus 1200 shown in FIG. 12 by invoking computer executable instructions stored in the memory 1220. Alternatively, a function/implementation process of the processing unit in FIG. 9 to FIG. 11 may be implemented by the processor 1210 in the communication apparatus 1200 shown in FIG. 12 by invoking computer executable instructions stored in the memory 1220, and a function/implementation process of the receiving unit or the sending unit in FIG. 9 to FIG. 11 may be implemented by the interface 1230 in the communication apparatus 1200 shown in FIG. 12.

It should be understood that the processing unit in the foregoing apparatus includes a processor, the processor is coupled to the memory, the memory is configured to store a computer program or instructions and/or data, and the processor is configured to execute the computer program or the instructions and/or the data stored in the memory, so that the method in the foregoing method embodiment is performed.

It should be further understood that division of units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware: or some units may be implemented in a form of software invoked by a processing element, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

An embodiment of this application further provides a communication system. The communication system includes the first network element, the second network element, and the third network element.

An embodiment of this application further provides a computer-readable medium, configured to store computer program code. The computer program includes instructions used to perform the communication method in embodiments of this application in the foregoing methods. The readable medium may be a read-only memory (ROM) or a random access memory (RAM). This is not limited in embodiments of this application.

This application further provides a computer program product. The computer program product includes instructions. When the instructions are executed, a first network element, a second network element, and a third network element perform operations corresponding to the first network element, the second network element, and the third network element in the foregoing method.

An embodiment of this application further provides a system chip. The system chip includes a processing unit and a communication unit. The processing unit may be, for example, a processor, and the communication unit may be, for example, an input/output interface, a pin, or a circuit. The processing unit may execute computer instructions, so that a chip in the communication apparatus performs any edge application server selection method provided in the foregoing embodiments of this application.

Optionally, the computer instructions are stored in a storage unit.

Optionally, the storage unit is a storage unit inside the chip, for example, a register or a buffer, or the storage unit may be a storage unit located inside the terminal but outside the chip, for example, a ROM or another type of static storage device that can store static information and instructions, or a RAM. Any processor mentioned above may be a CPU, a microprocessor, an ASIC, or one or more integrated circuits used to control program execution of the feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in this embodiment of this application may be a volatile memory or a nonvolatile memory, or may include a volatile memory and a nonvolatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM, and serves as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM), and a direct rambus random access memory (direct rambus RAM, DR RAM).

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining an application server, the method comprising:
   receiving, by a first network element in a communication network, first request information from a terminal device, wherein the first request information comprises first service description information, the first service description information identifies a service accessed by the terminal device, and the first request information includes a request to determine first information for the terminal device;
   in response to determining that the terminal device is in a first terminal group of a plurality of terminal groups, determining, by the first network element, the first information, wherein the first information is for determining a first application server for one or more terminal devices in the first terminal group;
   receiving, by the first network element, second information and second service description information, wherein the second information indicates to determine the first application server for the first terminal group, and the second service description information identifies a service accessed by the first terminal group; and
   receiving first area location information from another network device, wherein the first terminal group is located in a first area location indicated by the first area location information;

wherein the determining, by the first network element, that the terminal device is in the first terminal group comprises:
   determining that the service accessed by the terminal device is the same as the service accessed by the first terminal group; and
   the terminal device is located in the first area location indicated by the first area location information.

2. The method according to claim 1, wherein the method further comprises:
   sending, by a policy management function network element to the first network element, the second information and the second service description information.

3. The method according to claim 2, wherein the method further comprises:
   sending, by an application function network element to the policy management function network element, the second information and the second service description information.

4. The method according to claim 1, wherein the first service description information or the second service description information comprises at least one of-of:
   a fully qualified domain name (FQDN) and application identifier information.

5. The method according to claim 1, wherein the first network element is a session management network element.

6. The method according to claim 1, wherein the first information comprises at least one of:
   a first EDNS client subnet option (ECS option), a first data network access identifier (DNAI), and a first edge application server address (EAS IP).

7. The method according to claim 1, further comprising:
   sending, by an edge application server discovery function policy management function network element, the first request information to the first network element.

8. An apparatus, comprising:
   at least one processor; and
   at least one memory coupled to the at least one processor and storing programming instructions that, when executed by the at least one processor, cause the apparatus to:
   receive first request information from a terminal device, wherein the first request information comprises first service description information, the first service description information identifies a service accessed by the terminal device, and the first request information includes a request to determine first information for the terminal device;
   in response to determining that the terminal device is in a first terminal group of a plurality of terminal groups, determine the first information, wherein the first information is for determining a first application server for one or more terminal devices in the first terminal group;
   receive second information and second service description information, wherein the second information indicates to determine the first application server for the first terminal group, and the second service description information identifies a service accessed by the first terminal group; and
   receive first area location information from another network device, wherein the first terminal group is located in a first area location indicated by the first area location information;
   wherein the determining that the terminal device is in the first terminal group comprises:
   determining that the service accessed by the terminal device is the same as the service accessed by the first terminal group; and the terminal device is located in the first area location indicated by the first area location information.

9. The apparatus according to claim 8, wherein the first service description information or the second service description information comprises at least one of:
a fully qualified domain name (FQDN) and application identifier information.

10. The apparatus according to claim 8, wherein the apparatus is a session management network element.

11. The apparatus according to claim 8, wherein the first information comprises at least one of the following:
a first EDNS client subnet option (ECS option), a first data network access identifier (DNAI), and a first edge application server address (EAS IP).

12. A system, comprising: a first network element and an edge application server discovery function policy management function network element,
wherein the edge application server discovery function policy management function network element is configured to:
send first request information to the first network element;
wherein the first network element is configured to:
receive the first request information, wherein the first request information comprises first service description information, the first service description information identifies a service accessed by a terminal device, and the first request information is for requesting to determine first information for the terminal device;
in response to determining that the terminal device belongs to a first terminal group, determine the first information, wherein the first information includes a request to determine a first application server for a terminal device in the first terminal group;
receive, by the first network element, second information and second service description information, wherein the second information indicates to determine the first application server for the first terminal group, and the second service description information identifies a service accessed by the first terminal group; and
receive first area location information from another network device, wherein the first terminal group is located in a first area location indicated by the first area location information;
wherein the determining, by the first network element, that the terminal device is in the first terminal group comprises:
determining that the service accessed by the terminal device is the same as the service accessed by the first terminal group; and
the terminal device is located in the first area location indicated by the first area location information.

13. The system according to claim 12, further comprising: a policy management function network element configured to send the second information and the second service description information to the first network element.

14. The system according to claim 13, further comprising an application function network element configured to: send the second information and the second service description information to the policy management function network element.

15. The system according to claim 12, wherein the first service description information or the second service description information comprises at least one of:
a fully qualified domain name (FQDN) and application identifier information.

16. The system according to claim 12, wherein the first network element is a session management network element.

17. The system according to claim 12, wherein the first information comprises at least one of the following:
a first EDNS client subnet option (ECS option), a first data network access identifier (DNAI), and a first edge application server address (EAS IP).

* * * * *